US012671720B2

(12) United States Patent
Schory et al.

(10) Patent No.: US 12,671,720 B2
(45) Date of Patent: Jun. 30, 2026

(54) CYBER-SECURITY IN HETEROGENEOUS NETWORKS

(71) Applicant: JFROG LTD, Netanya (IL)

(72) Inventors: Omer Schory, Givatayim (IL); Or Peles, Tel Aviv (IL); Shmuel Ur, Shorashim (IL)

(73) Assignee: JFROG LTD, Netanya (IL)

( * ) Notice: Subject to any disclaimer, the term of this patent is extended or adjusted under 35 U.S.C. 154(b) by 0 days.

(21) Appl. No.: 18/353,161

(22) Filed: Jul. 17, 2023

(65) Prior Publication Data

US 2023/0362205 A1     Nov. 9, 2023

Related U.S. Application Data

(62) Division of application No. 16/898,549, filed on Jun. 11, 2020.

(60) Provisional application No. 62/860,281, filed on Jun. 12, 2019.

(51) Int. Cl.
H04L 9/40     (2022.01)
G06F 8/61     (2018.01)

(52) U.S. Cl.
CPC .............. H04L 63/205 (2013.01); G06F 8/61 (2013.01); H04L 63/1433 (2013.01)

(58) Field of Classification Search
CPC ... H04L 67/10; H04L 67/1008; H04L 67/101; H04L 67/1025; H04L 67/1029; H04L 67/1027; H04L 67/1095; H04L 67/60; H04L 67/63; H04L 67/205; H04L 63/20; H04L 63/14; H04L 63/1408; H04L 63/105; H04L 63/10; H04L 63/102; G06F 21/577; G06F 21/57; G06F 2221/034; G06F 2221/2141
See application file for complete search history.

(56) References Cited

U.S. PATENT DOCUMENTS

| 8,239,953 | B1 | 8/2012 | Satish | |
| 9,397,835 | B1 | 7/2016 | Campagna | |
| 10,706,155 | B1 * | 7/2020 | Veselov | G06F 9/45558 |
| 10,771,506 | B1 * | 9/2020 | Kumar | H04L 63/02 |

(Continued)

FOREIGN PATENT DOCUMENTS

| WO | WO-2014036021 | 3/2014 |
| WO | WO-2019118056 | 6/2019 |

*Primary Examiner* — Tae K Kim

(74) *Attorney, Agent, or Firm* — PEARL COHEN ZEDEK LATZER BARATZ LLP

(57)     ABSTRACT

A method and a computer program product and an apparatus for securing communication in heterogeneous networks that include devices with different protection levels. The method comprises monitoring, by a security agent installed on a device, communication between the device and external devices. The method comprises determining a level of in-device protection for each device based on available protection thereof. The method further comprises employing, by the security agent, an associated security policy for communications originating from the device, based on the level of in-device protection; such as resources utilized for employing security policies for communications originating from devices are correlated with the protection levels thereof. The method may further comprise enabling sharing security workload between device having trusted security agents to improve performance efficiency thereof.

9 Claims, 17 Drawing Sheets

(56) References Cited

U.S. PATENT DOCUMENTS

| 11,050,637 | B2 * | 6/2021 | Mahindru | H04L 41/0895 |
| 11,562,089 | B2 * | 1/2023 | Levy | H04L 9/0891 |
| 2012/0179824 | A1 * | 7/2012 | Jackson | H04L 47/827 |
| | | | | 709/226 |
| 2013/0205361 | A1 * | 8/2013 | Narayanaswamy | |
| | | | | H04L 63/1408 |
| | | | | 726/1 |
| 2013/0268861 | A1 * | 10/2013 | Bailey | G06F 9/5072 |
| | | | | 715/735 |
| 2014/0066015 | A1 * | 3/2014 | Aissi | H04W 4/60 |
| | | | | 455/411 |
| 2014/0157351 | A1 | 6/2014 | Canning | |
| 2014/0173686 | A1 * | 6/2014 | Kgil | H04L 63/205 |
| | | | | 726/1 |
| 2014/0189777 | A1 * | 7/2014 | Viswanathan | H04L 63/105 |
| | | | | 726/1 |
| 2014/0297662 | A1 * | 10/2014 | Wu | G06F 16/245 |
| | | | | 707/754 |
| 2015/0089062 | A1 * | 3/2015 | Reiter | H04L 47/70 |
| | | | | 709/226 |
| 2016/0036861 | A1 * | 2/2016 | Mattes | H04L 63/0281 |
| | | | | 726/1 |
| 2016/0142338 | A1 * | 5/2016 | Steinder | H04L 67/1023 |
| | | | | 709/226 |
| 2016/0359907 | A1 | 12/2016 | Lam | |
| 2017/0140154 | A1 | 5/2017 | Carpenter | |
| 2017/0141926 | A1 | 5/2017 | Xu | |
| 2017/0171170 | A1 | 6/2017 | Sun | |
| 2017/0180316 | A1 * | 6/2017 | Teng | H04L 63/105 |
| 2018/0067844 | A1 * | 3/2018 | Conti | G06F 11/3672 |
| 2019/0021004 | A1 | 1/2019 | Shanmugavadivel | |
| 2019/0138654 | A1 * | 5/2019 | Arora | G06F 9/45558 |
| 2019/0245894 | A1 | 8/2019 | Epple | |
| 2019/0319987 | A1 | 10/2019 | Levy | |
| 2020/0026564 | A1 * | 1/2020 | Bahramshahry | |
| | | | | G06Q 10/06316 |
| 2020/0137114 | A1 | 4/2020 | Bender | |
| 2020/0162471 | A1 * | 5/2020 | Borkar | H04L 63/102 |
| 2020/0259737 | A1 * | 8/2020 | Koshy | H04W 28/0883 |
| 2020/0327222 | A1 | 10/2020 | Chhabra | |
| 2020/0344353 | A1 * | 10/2020 | Lahav | G06Q 10/06 |
| 2021/0160962 | A1 * | 5/2021 | Duo | G06F 21/566 |
| 2021/0397494 | A1 * | 12/2021 | Graham | G06F 9/547 |

* cited by examiner

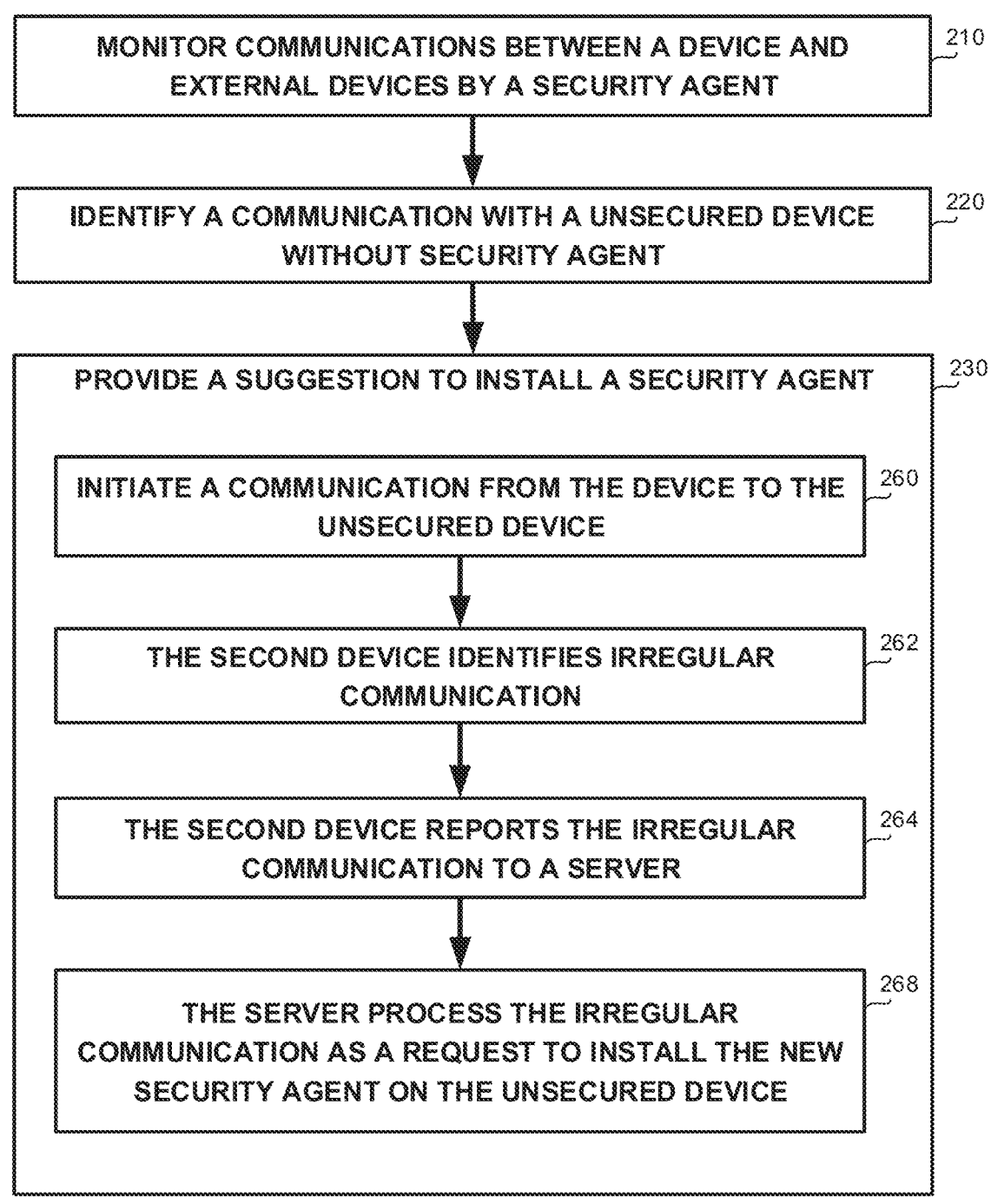

MONITOR COMMUNICATIONS BETWEEN A DEVICE AND EXTERNAL DEVICES BY A SECURITY AGENT          210

IDENTIFY A COMMUNICATION WITH A UNSECURED DEVICE WITHOUT SECURITY AGENT          220

PROVIDE A SUGGESTION TO INSTALL A SECURITY AGENT          230

INITIATE A COMMUNICATION FROM THE DEVICE TO THE UNSECURED DEVICE          260

THE SECOND DEVICE IDENTIFIES IRREGULAR COMMUNICATION          262

THE SECOND DEVICE REPORTS THE IRREGULAR COMMUNICATION TO A SERVER          264

THE SERVER PROCESS THE IRREGULAR COMMUNICATION AS A REQUEST TO INSTALL THE NEW SECURITY AGENT ON THE UNSECURED DEVICE          268

FIG .2C

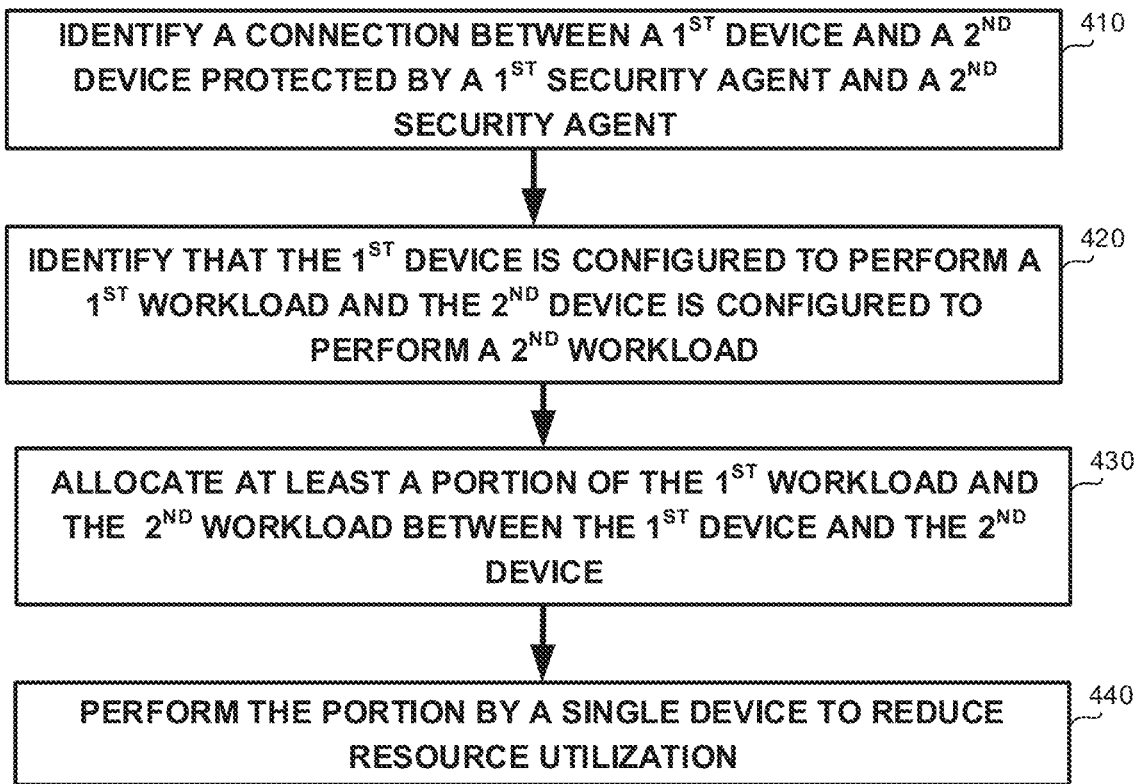

IDENTIFY A CONNECTION BETWEEN A 1ST DEVICE AND A 2ND DEVICE PROTECTED BY A 1ST SECURITY AGENT AND A 2ND SECURITY AGENT ⟋410

IDENTIFY THAT THE 1ST DEVICE IS CONFIGURED TO PERFORM A 1ST WORKLOAD AND THE 2ND DEVICE IS CONFIGURED TO PERFORM A 2ND WORKLOAD ⟋420

ALLOCATE AT LEAST A PORTION OF THE 1ST WORKLOAD AND THE 2ND WORKLOAD BETWEEN THE 1ST DEVICE AND THE 2ND DEVICE ⟋430

PERFORM THE PORTION BY A SINGLE DEVICE TO REDUCE RESOURCE UTILIZATION ⟋440

FIG. 4A

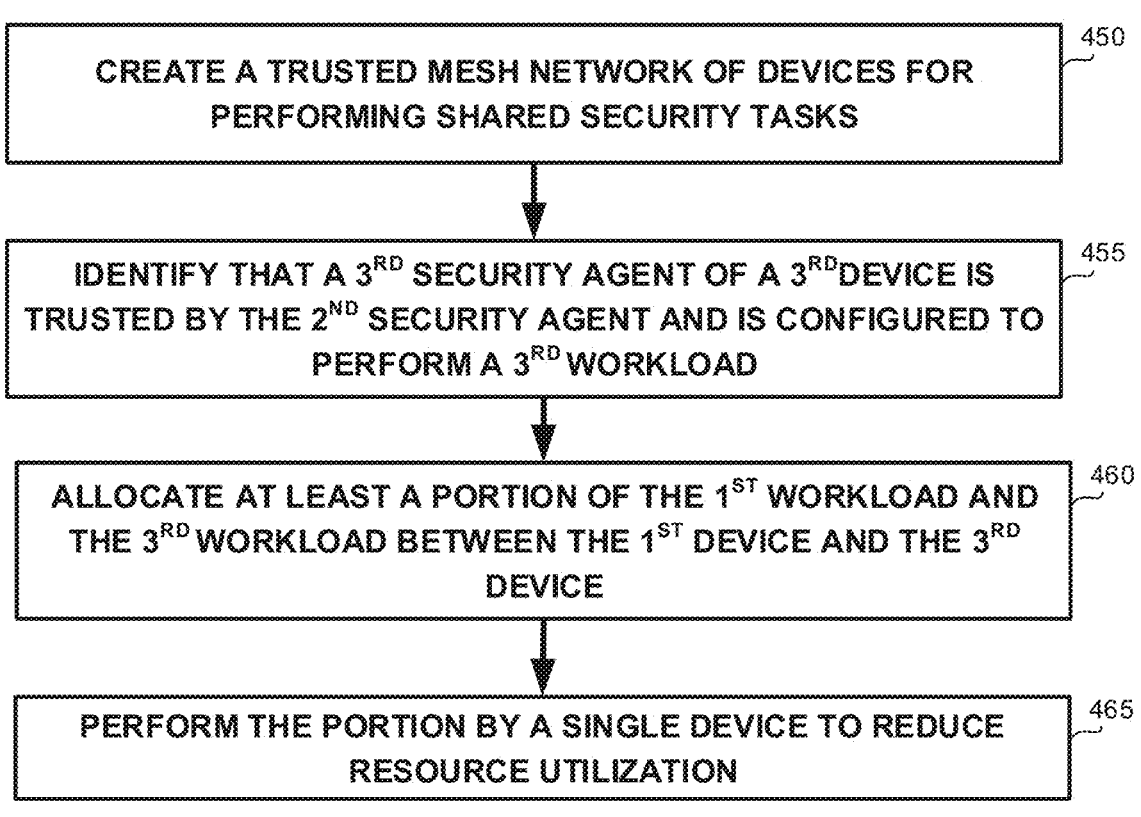

CREATE A TRUSTED MESH NETWORK OF DEVICES FOR PERFORMING SHARED SECURITY TASKS ⌐450

IDENTIFY THAT A 3$^{RD}$ SECURITY AGENT OF A 3$^{RD}$ DEVICE IS TRUSTED BY THE 2$^{ND}$ SECURITY AGENT AND IS CONFIGURED TO PERFORM A 3$^{RD}$ WORKLOAD ⌐455

ALLOCATE AT LEAST A PORTION OF THE 1$^{ST}$ WORKLOAD AND THE 3$^{RD}$ WORKLOAD BETWEEN THE 1$^{ST}$ DEVICE AND THE 3$^{RD}$ DEVICE ⌐460

PERFORM THE PORTION BY A SINGLE DEVICE TO REDUCE RESOURCE UTILIZATION ⌐465

FIG. 4B

IDENTIFY THAT A 4$^{TH}$ DEVICE NOT HAVING A SECURITY AGENT ⌐470

PROVIDE A SUGGESTION TO INSTALL A NEW SECURITY AGENT ON THE 4$^{TH}$ DEVICE ⌐475

DETERMINE THAT THE NEW SECURITY AGENT IS INSTALLED ON THE 4$^{TH}$ DEVICE ⌐480

ADD THE 4$^{TH}$ DEVICE TO THE MESH NETWORK ⌐485

FIG. 4C

CYBER-SECURITY IN HETEROGENEOUS NETWORKS

CROSS-REFERENCE TO RELATED APPLICATIONS

This application claims the benefit of U.S. provisional Application No. 62/860,281, entitled "Viral Security Platform", filed Jun. 12, 2019, which is hereby incorporated by reference in its entirety, without giving rise to disavowment.

TECHNICAL FIELD

The present disclosure relates to cyber-security in general, and to securing communication in heterogeneous networks that include devices with different protection levels, in particular.

BACKGROUND

As the world has become connected, devices that were once low-tech without computers or processors thereon, are now connected to the internet and to sensitive networks and exposed to the increasing number of cyber threats. Internet of Things (IoT) makers and organizations who use the devices and serve customers cannot afford the potential damage cyber-attacks hold, which makes now the right time for a security revolution.

Security platforms, such as VDOO™ may reach an unprecedented device security level by security agents installed on the devices. The security platform may automatically analyze the device, using the security agents, to discover and mitigate security gaps, gain physical and digital certification once the device is secure, protect deployed devices against known and unknown threats, expose attack methods targeting the devices with honeypots, gain real-time updates on new vulnerabilities found in the devices, or the like.

BRIEF SUMMARY

One exemplary embodiment of the disclosed subject matter is a method comprising: monitoring, by a security agent, installed on a device, communication between the device and external devices, wherein the external devices comprise at least a first device and a second device; determining a first level of in-device protection for the first device; determining a second level of in-device protection for the second device, wherein the second level is a higher protection level than the first level; employing, by the security agent, a first security policy for communications originating from the first device, wherein the first security policy is determined based on the first level of in-device protection; and employing, by the security agent, a second security policy for communications originating from the second device, wherein the second security policy is determined based on the second level of in-device protection, wherein the second policy utilizes more resources than the first security policy.

Optionally, said determining the first level comprises determining that the first device is protected by a second security agent, wherein the second security agent is trusted by the security agent; and wherein said determining the second level comprises determining that the second device is not protected by any security agent that is trusted by the security agent.

Optionally, the method further comprises: providing a suggestion to install a new security agent on the second device; and after determining that the new security agent is protecting the second device, employing the first security policy for communications originating from the second device; whereby reducing resource utilization by the security agent.

Optionally, said providing the suggestion comprises requesting a vendor of the second device to install the security agent on instances of devices of a type of the second device.

Optionally, the suggestion comprises: initiating a communication from the device to the second device, wherein the communication is configured to cause the second device to identify an irregular communication, whereby inducing the second device to report the irregular communication to a server, wherein the reported irregular communication is configured to be processed by the server as a request to install the new security agent on the second device.

Optionally, said providing the suggestion comprises: informing an intermediate gateway of a compromised communication from the second device, whereby causing the intermediate gateway to automatically install the new security agent on the second device.

Optionally, the second security agent is determined to be trusted by the security agent due to at least one of: the second security agent is an instance of a base agent, wherein the security agent is also an instance of the base agent; the second security agent is listed in a list of trusted security agents; the second security agent is published by a vendor, wherein the vendor is listed in a list of trusted vendors; and the second security agent is published by a vendor that published the security agent.

Optionally, said determining the second-level of in-device protection is based on vulnerability information associated with devices from a type of the second device, wherein the vulnerability information is obtained from a vulnerability database.

Optionally, the second security policy comprises an examination action for incoming communications, wherein the examination action comprises: determining whether an incoming communication is associated with a compromising action and in response to a determination that the incoming communication is associated with the compromising action, performing a responsive action; wherein the first security policy excludes the examination action; whereby the examination action is performed with respect to communication originating from the second device and is not performed with respect to communication originating from the first device.

Optionally, the second security policy comprises: directing traffic from the second device to the device through a server, wherein the server is configured to process communication from the second device to the device to determine validation thereof; and in response to the server validating the communication, transferring the communication to the device; whereby security validation of communications originating from the second device is performed, at least partially, in the server and off-device with respect to the device.

Optionally, the second security policy comprises utilizing resources of a trusted server to improve security of the device with respect to communications originating from the second device, wherein the first security policy is devoid of utilization of the resources of the trusted server.

Optionally, said utilizing comprises executing a second security agent on the trusted server, wherein the second security agent is configured to validate outgoing communications from the second device; wherein the first device is configured to execute a first security agent, wherein the first security agent is configured to validate outgoing communications from the first device; wherein the second security policy comprises employing, the first security policy for communications originating from the second device and tunneled through the server.

Optionally, the method further comprises: installing a new security agent on the device, wherein the new security agent is configured to process communications originating from the second device, whereby mitigating the potential risk to the device resulted from the communication from the second device using a dedicated security agent.

Optionally, the method further comprises: installing a new security agent on a third device, wherein the third device is connected to the device, wherein the new security agent is configured to process communications originated from the second device to the device, whereby mitigating the potential risk to the device resulted from the communication from the second device using a dedicated security agent.

Optionally, the external devices comprise a third device, wherein the method further comprises: determining a third level of in-device protection for the third device, wherein said determining the third level comprises determining that the third device is not protected by any security agent that is trusted by the security agent, wherein the third level is a higher protection level than the second level; wherein said determining the second level comprises determining that the second device is not protected by any security agent that is trusted by the security agent; employing, by the security agent, a third security policy for communications originating from the third device, wherein the third security policy is determined based on the third level of in-device protection, wherein the third policy utilizes more resources than the second policy.

Another exemplary embodiment of the disclosed subject matter is a method comprising: identifying a connection between a first device and a second device, wherein the first device is protected by a first security agent installed thereon, wherein the first security agent is configured to monitor communications between the first device and external devices, wherein the second device is protected by a second security agent installed thereon, wherein the second security agent is configured to monitor communications between the second device and external devices, wherein the first device is configured to perform a first security workload, wherein the second device is configured to perform a second security workload; allocating at least a portion of the first security workload and the second security workload between the first device and the second device, whereby improving efficiency of performing the first security workload and the second security workload.

Optionally, the method further comprises: determining an intersection between the first security workload and the second security workload, wherein the intersection comprises overlapping workload configured to be performed by the first device and by the second device; wherein the portion of the first security workload and the second security workload comprises the overlapping workload; wherein said allocating defines that each task of the overlapping workload is performed by a single device, whereby reducing overall resource utilization of the first and second devices in performing the first and second security workloads.

Optionally, said allocating is performed based on real-time available resources of the first device and the second device.

Optionally, the first security workload is a concretization of the second security workload, wherein said allocating comprises determining to perform the first security workload and not the second security workload, wherein the method further comprises utilizing an output of the first security workload instead of performing the second security workload.

Optionally, the first device and the second device are comprised by a trusted mesh network; wherein the second security agent is trusted by the first security agent; wherein the trusted mesh network comprises a third device, wherein the third device is protected by a third security agent installed thereon, wherein the third security agent is configured to monitor communications between the third device and external devices, wherein the third security agent is trusted by the second security agent; wherein the third device is configured to perform a third security workload; wherein said allocating further comprises allocating at least a portion of the first security workload and the third security workload between the first device and the third device, wherein the third device is enabled to share the third security workload with the first device without determining that the third security agent is trusted by first security agent, whereby improving efficiency of performing the first security workload and the third security workload.

Optionally, the method further comprises: identifying a communication between the first device and a fourth device; determining that the fourth device is not protected by any security agent that is trusted by a security agent installed on a device comprised by the mesh network; providing a suggestion to install a new security agent on the fourth device; and after determining that the new security agent is protecting the fourth device, adding the fourth device to the trusted mesh network, whereby enabling the fourth device to share security tasks with other devices in the trusted mesh network; whereby reducing resource utilization by security agents of devices in the trusted mesh network.

Yet another exemplary embodiment of the disclosed subject matter is a computerized apparatus having a processor, the processor being adapted to perform the steps of: monitoring, by a security agent, installed on a device, communication between the device and external devices, wherein the external devices comprise at least a first device and a second device; determining a first level of in-device protection for the first device; determining a second level of in-device protection for the second device, wherein the second level is a higher protection level than the first level; employing, by the security agent, a first security policy for communications originating from the first device, wherein the first security policy is determined based on the first level of in-device protection; and employing, by the security agent, a second security policy for communications originating from the second device, wherein the second security policy is determined based on the second level of in-device protection, wherein the second policy utilizes more resources than the first security policy.

Yet another exemplary embodiment of the disclosed subject matter is a computer program product comprising a non-transitory computer readable storage medium retaining program instructions, which program instructions when read by a processor, cause the processor to perform a method comprising: monitoring, by a security agent, installed on a device, communication between the device and external devices, wherein the external devices comprise at least a first device and a second device; determining a first level of in-device protection for the first device; determining a second level of in-device protection for the second device, wherein the second level is a higher protection level than the first level; employing, by the security agent, a first security policy for communications originating from the first device, wherein the first security policy is determined based on the first level of in-device protection; and employing, by the security agent, a second security policy for communications originating from the second device, wherein the second security policy is determined based on the second level of in-device protection, wherein the second policy utilizes more resources than the first security policy.

Yet another exemplary embodiment of the disclosed subject matter is a computerized apparatus having a processor, the processor being adapted to perform the steps of: identifying a connection between a first device and a second device, wherein the first device is protected by a first security agent installed thereon, wherein the first security agent is configured to monitor communications between the first device and external devices, wherein the second device is protected by a second security agent installed thereon, wherein the second security agent is configured to monitor communications between the second device and external devices, wherein the first device is configured to perform a first security workload, wherein the second device is configured to perform a second security workload; allocating at least a portion of the first security workload and the second security workload between the first device and the second device, whereby improving efficiency of performing the first security workload and the second security workload.

Yet another exemplary embodiment of the disclosed subject matter is a computer program product comprising a non-transitory computer readable storage medium retaining program instructions, which program instructions when read by a processor, cause the processor to perform a method comprising: identifying a connection between a first device and a second device, wherein the first device is protected by a first security agent installed thereon, wherein the first security agent is configured to monitor communications between the first device and external devices, wherein the second device is protected by a second security agent installed thereon, wherein the second security agent is configured to monitor communications between the second device and external devices, wherein the first device is configured to perform a first security workload, wherein the second device is configured to perform a second security workload; allocating at least a portion of the first security workload and the second security workload between the first device and the second device, whereby improving efficiency of performing the first security workload and the second security workload.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIGS. 2A-2C show flowchart diagrams of a method, in accordance with some exemplary embodiments of the disclosed subject matter;

FIGS. 4A-4C show flowchart diagrams of a method, in accordance with some exemplary embodiments of the disclosed subject matter;

DETAILED DESCRIPTION

Figure 1A:
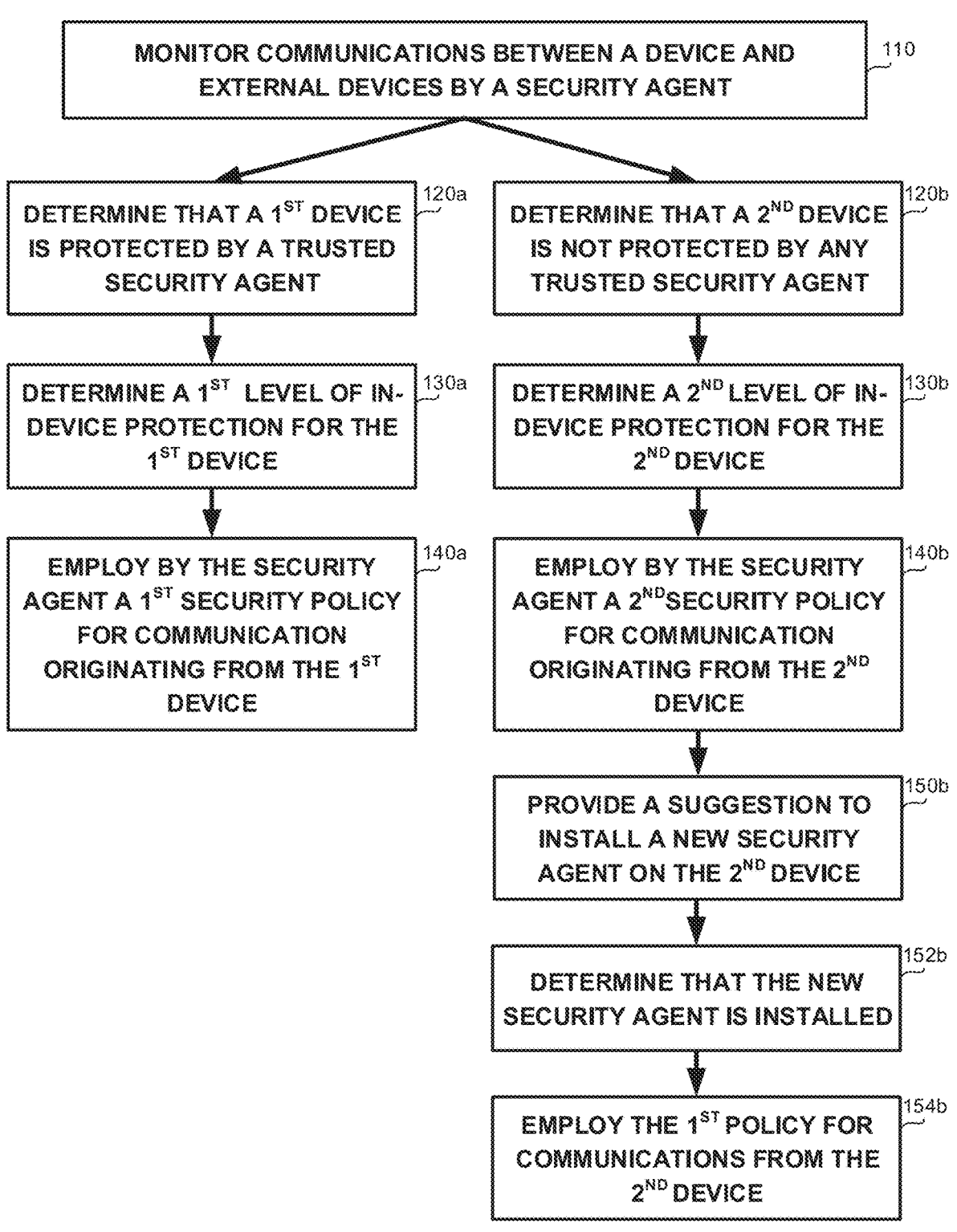
FIGS. 1A-1E show flowchart diagrams of a method, in accordance with some exemplary embodiments of the disclosed subject matter.

One technical problem dealt with by the disclosed subject matter is protecting devices from attacks directed from compromised devices that the devices are connected thereto. In some exemplary embodiments, devices that are protected with a security agent, may still be exposed to security attacks from devices connected thereto. As an example, the security agent may be installed on a first device and may be configured to protect the first device. The first device may be connected to a second device that is not equipped with a security agent or any other protection against attacks. In such a case, the first device may be compromised through the second device.

One technical solution is to utilize properties of the security agent installed on the protected device, in order to protect from attacks that may arise from the communication with the compromised device. In some exemplary embodiments, the properties of the security agent installed on the protected device, may be utilized in a preprocessing stage, before the protected device connects with an untrusted device. The security agent of the first protected device may be configured to determine whether the compromised device scans the first device, if the second device sends maliciously crafted messages to the first device, or the like. In some exemplary embodiments, the security agent may be configured to determine, based on a type of the compromised device, what attack or other potential threats can be performed by the compromised device, or can be associated with communication with the compromised device. As a result, the security agent on the protected device, when contacted by an unsecured device, may know how to act, which security actions to perform, or the like.

In some exemplary embodiments, a vulnerabilities database may be created for each type of devices. The vulnerabilities database may comprise, for each type, a list of vulnerabilities that may be associated with devices from that type, a list of attacks that can work on the device, weaknesses thereof, known security bugs, or the like. In some exemplary embodiments, devices that have some security agent installed thereon, may be protected from the listed vulnerabilities, attacks, weaknesses, security bugs, or the like, directly by the security agent installed thereon. Thus the security agent of the protected device, may not be required to perform any security check or responsive action for communications therewith, if the security agent identifies that the other device is also protected by a security agent, familiar therewith. Additionally or alternatively, if the security agent does not identify a trusted security agent on the other device communicating therewith, the security agent may be configured to monitor communications between the protected device and other devices. By monitoring the communications, the security agent may be aware of potential attacks directed from other devices that are not protected by a security agent. The security agent may be configured to determine, based on the vulnerabilities database of the type of the device communicating with, what potential threats or attacks may be performed by the device, and act accordingly. The security agent may be configured to determine what security actions to perform for each potential threat or attacks, as defined in the preprocessing stage.

Additionally or alternatively, the security agent may be configured to collect information about the risks that the secured device is potentially exposed to because of being connected to an unsecured device. In particular, for each pair of devices X, Y; where X is a device with a security agent, and Y is a device without a security agent, an attack risk may be calculated. The attack risk may be the potential risk that X may be exposed to due to Y being compromised. Solutions to mitigate such risks may be determined based on the type and measure of the attack risk, such as which protocols may be attacked, the number of devices related to device X (such as in an associated organization or network) that may be affected by the compromised communication, or the like. The security agent may be configured to perform a respective security action or solution based on the potential attack risk of the communication. As an example, communications from the compromised device Y, with a high potential risk (such as an attack risk above 50%), may be automatically blocked by the security agent of device X. Receiving communication with a higher potential risk (such as above 80%) may even disable the whole communication with the compromised device. As another example, communications that are less likely to affect the device X, or communications risking only certain types of protocols, communications with potential risk via specific commands, or the like; may be partially enabled, such as offering only partial services, executing specific defenses on device X against the possible compromises of device Y, monitoring activities on device X to figure out if Y is compromised, reporting to the network (e.g., Firewall, Network Access Control (NAC), Security Information And Event Management (SIEM), Edge gateway, or the like) about the suspected device Y to take further remediation through the other solutions, or the like. Additionally or alternatively, a report to the cloud or to the operator of the security agent may be issued, on the potentially attacking device, to communicate the information to the vendor and implement security measures to block such attacks, such that the security agent on device X, when contacted by device Y, may know how to act. Additionally or alternatively, a server associated with device X may be configured to identify that device X is associated with a high risk, such as because of communicating with outside the net, communicating with new devices, or the like. The server may send instruction for device X for a safer communication.

Additionally or alternatively, the properties of the security agent installed on the protected device, may be utilized in the field of data collection from unsecured devices. Such data may be retained and utilized by the vendor of the security agent for securing future communications with similar devices. Protected device may know using some authentication protocol with the vendor, how to monitor its communication with similar unsecured device, even when not having a dedicated security agent for such communications. The vendor may be configured to provide authentication data to the device for communication with the unsecured devices.

In some exemplary embodiments, when the protected device (e.g., the device having the security agent installed thereon) connects to a device, the security agent may be configured to identify the identity of the device, whether the device has a security agent installed thereon, what trusted information may be obtained from the security agent on the device, what protocols the device may use for communication, what libraries the device may access, how packets from the device may look like, what may the device ask for from the protected device, whether the device is updated or not, whether the device is in a supported version or no longer supported (e.g., by the manufacture or the vendor thereof), whether the device has Common Vulnerabilities and Exposures (CVEs) that impose immediate risk on the other devices or not, how to obtain reliable information from the device and how reliable the information is, or the like. Such information may be collected by a vendor of the security agent, to determine relevant security solutions for future communication with instances of the device.

Additionally or alternatively, the properties of the security agent installed on the protected device, may be utilized as a security addition to the unsecured device. In some exemplary embodiments, the security agent of the protected device may consult a security database, that comprises security measures and rules based on information collected on the unsecured device, and provide based on related information, an adapted security layer, to operate on the unsecured device for securing communications with other devices similar to the protected device, or other devices that may potentially compromise the protected device via the communication with the unsecured device, or the like. Additionally or alternatively, the security agent may be configured to prevent potential attacks from the unsecured device to other devices. As an example, if the attack goes through an unsecured device X, to a protected device Y then to unprotected device Z, where the attack is performed on Z; even though Z may not be protected, the attack may not work because of the protection on Y.

In some exemplary embodiments, a problem that may arise is that a secured device may not be capable to consult the full table of all the devices it may be connected to. Such a problem may arise due to storage issues. Additional problem may be that the table may not be up to date. The solution may be to generalize the security tables such as to be adapted for types of devices, types of protocols and existence of trusted agents, or the like, and not only for certain devices. Such tables may be retained on the cloud, on a trusted server, on a platform of the vendor of the security agent, or the like. The protected device, or the security agent thereof, may be configured to look for information about the type of devices, type of protocols and existence of trusted agents in the cloud, and accordingly adapt its operation.

In some exemplary embodiments, when a protected device is connected to an unsecured device, an attack from the unsecured device may be performed on the protected device through the connection. Some attacks may depend on protocols utilized in the connection between the devices, some attacks may happen only with specific devices, or the like. The attacks and possible consequences may be investigated using the CVE. In some exemplary embodiments, a set of rules may be set up based on the CVE results, such as "if the unsecured device uses a certain protocol X, disable certain features 1,2,3", "if the unsecured device has a security agent (e.g., is a VDOO™ client) disable only certain features", "if the unsecured device uses a certain protocol X, enable defenses 1,2,3", "if the unsecured device has a security agent (e.g., is a VDOO™ client) enable only a certain defense", or the like. Additionally or alternatively, in case there is enough storage on the device, the generalization based on protocols may not be needed. It may be appreciated that data on the interactions may be collected and shared with the security agent's operator.

Additionally or alternatively, the properties of the security agent installed on the protected device, may be utilized in order to improve the security of the unsecured device and communications therewith by performing updates. In some exemplary embodiments, the operator (also referred to as the vendor) of the security agent (e.g., VDOO™) may receive information from the device. The information may be received periodically from the security agent. The information may comprise information about the protected device, information about other devices that the protected device connects, or the like. As an example, the information may comprise identity of the devices, version, protocols used for communication therewith, certifications, agents, log of the interaction with the devices, or the like. The operator of the security agent may create a policy based on the information received from the security agent, and upload it to the device. As an example, assuming protected device X was connecting to unsecured device Y, which uses protocol Z. Device X may be careful about protocol Z and may disable some of its features, to maximize the security. The operator of the security agent may be informed that device Y may be trustworthy (even though other devices may still be compromised), and may accordingly update device X not to disable those features. The operator of the security agent may update device X to work better and more efficiently while remaining secure.

In some exemplary embodiments, a vendor of the security agent may be configured to update the security policy employed for some devices, based on data provided by the security agent. As an example, a protected device X may be a gateway (e.g., Hub), such as a network hardware device for connecting multiple Ethernet devices together and making them act as a single network segment. The security agent installed on the gateway, may act as a detection engine, a Distributed Web Application Firewall (WAF), a logging engine, or the like. Device Y, a new camera, may be detected on the network. The camera may try to communicate with the gateway, however, the new camera may not be a trusted device (e.g., the security agent may not recognize it as a trusted device, may not identify a trusted security agent thereon, may identify a potential risk associated with communication therewith, or the like). The camera may try to communicate with the gateway using two different protocols: RTSP—a protocol used to transmit media, and SNMP—a protocol used to manage remote devices. Access using RTSP may be allowed, while some SNMP commands from the camera may be blocked, allowed but required to be authorized first by the security agent, or the like. A few weeks later, device X, the gateway, may communicate with the operator of the security agent (e.g., VDOO™) to validate that device Y, the camera that is connected thereto. The operator of the security agent may check if device Y is actually safe and does not create security risks. The operator of the security agent may transmit to device X what to do with device Y, such as which SNMP commands device Y can use, and which need to be verified by the security agent. In a generalized scenario, for each untrusted device, the security agent may process incoming data but ignore control and management requests.

In some exemplary embodiments, the security agent may be configured to allow only a partial list of actions to devices that are not trusted, partially trusted, or the like Partially trusted devices may be allowed to request operational information but not information that may compromise other devices. As an example, a protected device X may be a thermostat (edge device). Device Y, a new gateway may be detected. Device Y, the gateway, may be known, and may have partial trust. Device Y, the gateway, may request measurement information from device X, the thermostat. The request may be allowed. When device Y, the gateway, requests to change the measurement units, from Celsius to Fahrenheit, the request may be allowed. However, if the gateway requests a list of all the passwords and users that are stored on the device, the request may be blocked.

Another technical problem dealt with by the disclosed subject matter is optimizing the performance and functionality of security agents. In some exemplary embodiments, different devices that are connected may have similar security agents installed thereon, such as security agents from the same operator, the same vendors, cooperated vendors, or the like. In such cases, if the security agent of the first device handles a certain risk of the connection, the security agent of the second device may not need to do it, and vice versa. As an example, if device X checks the commands, device Y may not need to check the result of this command. Currently this work may be done in both devices, while utilizing doubled resources. Different related problems may arise, such as how to decide in which device to do the work, can the devices decide between them or an outside operator is required to help, whether to trust the other device, or the like. Such technical problem may arise in IoT devices that may be connected for performance reasons, and may have similar security agents. The main problem that may arise may be security, e.g., the IoT device may not trust the other side. Even if the IoT device trusts the server, complex computations may be still needed to perform the security sharing.

Another technical solution is to create a mesh network (e.g., an ad-hoc network) between the trusted devices to share resources and allocate them therebetween better for efficiency. As a result, if one device performs a certain security operation, then the other device, connected thereto in the mesh network, may not be required to perform the same operation. In some exemplary embodiments, the mesh network may define the protocol and the division of the operations between the devices, such as enabling controlled sending of workload between devices, preventing sending workload from an IoT device to another, limiting workload to include data files or communication only and not executable files, limiting the communication to pre-defined rules, such as only encrypted communication, avoiding some verification on workload as trusted, allowing functionality not normally allowed as trusted, or the like.

In some exemplary embodiments, allocating the shared workload between connected device may be performed by a workload sharing protocol. Such allocation may be static, e.g., a predetermined allocation may be performed based on features of the connected devices. The workload sharing protocol over the mesh network may comprise, in response to identifying that two connected devices have similar or trusted security agents, deciding using protocols, which device should do what operation or tasks from the workload. Additionally or alternatively, operations or tasks which the protocol does not solve, the shared operator of the security agent may decide how to divide. In some exemplary embodiments, the protocol may have at least two forms. The first form may assume that one device has a security agent while the other is not protected by a trusted security agent. As an example, device A may connect to device B, and may not be aware of a security agent on device B; device A may run some workload on the security agent thereof to protect from device B and may restrict some options as it does not trust device B. The second form may assume that both devices have similar security agents, and thus device A may run reduced workload as it needs less protection from device B and may restrict less functionality as it does trust device B. In some exemplary embodiments, the other device may also perform security checks before accepting sharing workload. As an example, if device A sends commands to device B, device B may run workload to check if the commands are trustable. Device B may also decide what commands or tasks from the workload device A is requesting to share, to perform. As an example, device B may avoid performing tasks or executing commands that can be used to attack other devices. Additionally or alternatively, allocating the workload may be performed dynamically based on real time status of the connected device, such as current available resources, power, or the like. As an example, the allocation may be performed based on the current power situation of the connected devices. The workload may be assigned to the device having more power, more available resources, or the like.

Yet another technical solution is to utilize resources of a server of the vendor of the security agent. Devices having security agents installed thereon, may connect using the security agent to the server associated therewith, such as a server provided by the vendor or the operator of the security agent. By connecting to the server and utilizing resources thereof, the devices may become more powerful in processing, storage, functionality, or the like.

Yet another technical problem dealt with by the disclosed subject matter is inducing connected devices to download a security agent. In some exemplary embodiments, protected devices that have a security agent installed thereon may connect to unprotected devices with no security agent. Unprotected devices may be also desired to have a security agent in order improve security, functionality, power, user experience, or the like.

Yet another technical solution is to report unsecured devices to the vendor or operator of the security agent, so the operator can induce the unsecured device or an operator thereof to install a security agent. In some exemplary embodiments, the first device may connect to the operator and provide information about the unsecured device connecting thereto. The information may comprise location of the unsecured device, connections protocols, reasons for why should the unsecured device have a security agent, or the like. The operator may search for the owner of the unsecured device and convince the owner to install the security agent. However, devices may not trust operators to automatically deploy security agents thereon. In such cases, an interim solution that suggest communication with the devices through edge gateway, may be deployed. The edge gateway may have a module of the operator install thereon, to monitor the unsecured device and take action.

Additionally or alternatively, the secured device may be configured to directly request the unsecured device to install a security agent. In some cases, an a-priori protocol between the two devices that enables such automated request may exist and be utilized. Additionally, or alternatively, where no such protocol exists, the secured device may perform an action that may be configured to cause the unsecured device to report an unusual event to its server. The server may decode the unusual event and may be useful for invoking the server or an operator thereof to download the security agent to the unsecured device, to other instances of the unsecured device, or the like. As an example, a secured device A may misrepresent itself as device X which is not known to the unsecured device B. Device B may report such communication to the server. In some cases, as part of the protocol between device B and its server, the server may instruct device B to install a driver or an update. The instruction from the server may comprise an instruction to download the security agent to device B automatically. Additionally, or alternatively, the server may send the security agent to device B for installation. Additionally, or alternatively, the server may inspect the communication and based thereon may extract an identifier of the device from which the communication originated. The server may examine a lookup table or a web-resource, such as a database indicating which driver is relevant for which device, and identify the security agent to be installed. Additionally, or alternatively, the server may log unusual events in its log for manual inspection. The logged event may include elements from the communication itself. In some exemplary embodiments, the communication may include elements such as a URL to a downloadable security agent, a URL to a website enabling integration of the security agent, a text string such as "Please contact VDOO™ to improve the security of your device", Please download a VDOO™ security agent to enable faster communication with your device", or the like.

Yet another technical solution is to utilize a man-in-the-middle protection by a server of the security agent, by a device in the network having a strong security agent, or the like. In some exemplary embodiments, devices may communicate with intermediator getaways. A device X with a security agent may be connected to a device Y without a security agent. In some exemplary embodiments, a communication of a secured device, such as device X, communicating with an unsecured device, such as device Y, may have adverse consequences, such as requiring resources for validation, and therefore hindering performance, providing a reduced set of functionality with the unsecured device, or the like. In some exemplary embodiments, device X may inform the intermediator getaway of the situation. The intermediator getaway may install a security agent on the device Y, to avoid the adverse consequences.

Additionally or alternatively, the intermediator getaway may reroute the traffic from device Y to device X through a server that validates it. In such a case, the communication from device Y may be received by the operator of the security agent. As an example, instead of device Y talking to device X, the operator's server may listen, process the communication (for example validate it) and transfer validated communication to device X. As a result, device X may treat the validated communication as arising from a secured device, and avoid adverse consequences of communication from untrusted source. Additionally or alternatively, the information obtained from device Y may be of interest to the intermediator getaway. In such a case, the intermediator gateway may perform some security actions. As an example, if device Y is unknown to the intermediator getaway, or the connection between device X and device Y is not regular or familiar, the action may be that the operator of the security agent is informed to get additional feedback, analysis, or the like.

Yet another technical problem dealt with by the disclosed subject matter is to enable a secure discussion between devices having security agents. A first security agent may be required to recognize and trust a second security agent. In some exemplary embodiments, security agents may use encryption on communications with other devices. As a result, some functionalities may be performed automatically between devices having security agents regardless as to which device is on the network. Such may be useful when the two security agents are operated by the same operator.

Yet another technical solution is to divide the network into a subnet of devices having a security agent from the same operator and another subnet of the other devices. Communication between the two subnets may be controlled via a server to protect all devices having a security agent from the operator. The communication to the devices may be routed through a server of the operator and the device may be protected by the server, which may be a stronger device with lots of capabilities.

Additionally or alternatively, security agents may be configured to enforce security protocols of the operator thereof. A policy may be created for each user or device having the security agent. The policy may define who the device can communicate with and how. The policy may be created by the operator of the security agent for the user and enforced by the security agent. A single user may have a plurality of devices from different vendors and may be required to decide on a policy for communication therebetween. The policy may be applied via the security agent. Part of the policy may define how to communicate with devices without a security agent.

In some exemplary embodiments, when an IoT device with a security agent detects that it is under attack, the device may be configured to inform its operator, other security agents of other devices that the IoT device connected thereto, or the like, that it is under attack. As a result, devices in the network may decline communications from the IoT device for a predetermined timeframe, stop assuming that the IoT device is trusted, stop assuming the environment is trusted, execute more validation, restrict one or more functionalities associated with the IoT device, detect more relevant attacks such as in the IoT device or in similar devices, help the IoT device by doing validation for it, stop working with some IP addresses, or the like.

Additionally or alternatively, a communication map of devices and information about security agents thereof, may be created. The map may comprise communications between security agents, tasks of each agent, or the like. In some exemplary embodiments, security agents on the device may know which other devices they communicate with, type of the communication, how long is the communication, what payload is provided, or the like. Such information may be utilized by the operator of the security agents to create a partial map of the IoT devices and who they talk to. It may be appreciated that the maps may change over time. It may further be appreciated that the maps may be created based on data obtained from the security agents. As an example, if a camera broadcasts an object in a home network that the refrigerator uses, listening on the network may not tell the operator that the two devices are "talking", as the security agents thereof may not report such communications.

Yet another technical solution is to create a trusted mesh network of devices that can share security tasks or perform such tasks for unprotected devices. The trusted mesh network may comprise all devices that are protected by security agents (such as security agents operated by the same operator or vendor). The resources of such devices may be utilized to perform security tasks related to other devices, such as monitoring other devices within the network, looking for anomalies, or the like. While one IoT device may not have much power to perform such tasks, mesh network of trusted devices may perform the tasks, even when a security agent is not installed on the IoT device.

Yet another technical solution is to upgrade devices with security agents, or connecting them to security agents' server while maintaining security. In some exemplary embodiments, a security agent of a device may have two functionalities: protecting the device from security attacks and extending the device functionality through connection to the server. As an example, a camera with a security agent installed thereon, that is connected to a server of the security agent, may function as a better camera. Such device may have more storage, faster processing, more processing, or the like. As a result, because of the connection to the server, such device may be capable of performing tasks that are not usually possible for such type of device, such as face recognition, while still being secure.

Yet another technical solution is to open ports for free communication between devices depending on trust. In some exemplary embodiments, the security agents of both devices may belong to the same organization. The keys they have from the domain controller may show that the domain controller trusts both as the same organization and in the same organization you can trust other devices. As a result, one device may validate that the other device is in the same organization (using standard techniques) and if it is, may share work with it. Additionally or alternatively, a device with a security agent may be certified by the operator of the security agent that it is secure. Such a device may be trusted by other devices even if its owner is not trusted, as the device may not be compromised from doing the work for the client. This may be done via a trusted execution environment such as blog.quarkslab.com/introduction-to-trusted-execution-environment-arms-trustzone.html. The agent may prove to the device with the security agent, that its workload will be executed, via the agent, in such environment. In this case the device "does not care" if the other device with a security agent belongs to a malicious entity as it knows what kind of device it is, and the operator of the security agent certified that this kind of device can supply the services securely. Additionally or alternatively, the service may be performed in a way which trust in the other device is not needed. The other device may need to be able to supply the work, but not the trust. As an example, the service may be performed in a trusted server. However, the work cannot be sent to the trusted server because the communication capacity may not be known. So, the requests may be encrypted and sent to a second device. The second device may forward the request to the trusted server that may know how to decrypt and do the work. The trusted server may encrypt the result, send it to the second device which forward back to the origin device. The second device may not be configured to do anything with the workload as it is encrypted. The second device may be configured only to forward the workload or not. In order to prevent a situation that the second device does not forward the workload, the same request may be forwarded using multiple devices. As another example, the service may be performed via homomorphic workload. The second device may get a workload which is encrypted, and perform the computation on the workload while it is encrypted, so a lot less trust is necessary.

Yet another technical problem dealt with by the disclosed subject matter is providing protection to devices that cannot have a security agent directly installed thereon. In some exemplary embodiments, devices, such as IoT devices, may have limited computational resources, such as having a small or weak CPU, or having limited power, or the like, that may not enable running a security agent on the device.

Additionally or alternatively, some IoT devices may not be allowed or authorized (such as by the manufacture, the user, or the like) to install a security agent thereon. In some exemplary embodiments, the limited device may not be attached to a device being served or protected by a security agent (such as VDOO™).

Yet another technical solution is to install a simplified remote security agent on a different device that is connected to the limited device. In some exemplary embodiments, the simplified security agent may have a lower protection power comparing to a regular security agent that is installed on the device itself, as the simplified security agent may not have an access to all of the communications of the limited device. As an example, the simplified security agent may be unable to read internal state and Input/Output of the device, may have an access only to the Input/Output, may have access to communications performed on the network, or the like.

In some exemplary embodiments, the simplified security agent may be generated dynamically to suit the limited device. A general security agent may be generated and dynamically adapted for the limited device, such as by analyzing its communications and activities, learning which attacks works thereon, what communication compromise the device or the like. Additionally or alternatively, the simplified security agent may be adapted to serve the interests of the device requesting the generation thereof. As an example, the simplified security agent may be configured to ensure that the limited device may not compromise the source device.

It may be noted that the generation of the simplified security agent may depend on the source device (e.g., the device asking for generating the simplified security agent), the target device (e.g., the device that the simplified security agent is generated for), or the like. Different simplified security agents may be generated for different source devices and for the same target device, and vice versa.

Yet another technical problem dealt with by the disclosed subject matter is providing protection to devices in a network that comprises devices that do not have a security agent. In some exemplary embodiments, networks may comprise a plurality of devices. Some of the devices may be protected by security agents and other may not. Such a situation may compromise communications over the network, even communications provided to devices protected by security agents.

Yet another technical solution is to create a security agent for the limited device (e.g., a device that does not have or cannot have a security agent) in the network. The network security agent may be used by other devices that do have security agents for communicating with the device as if it has a partial security agent. The network security agent may be configured to monitor the device and the communications the device performs with other devices in the network. Additionally or alternatively, the network security agent may be configured to reply to questions from other security agents of other devices in the network, from a server, or the like, such as "is it safe to perform a certain task?", "Is the device compromised?", or the like. Additionally or alternatively, the network security agent may be configured to end communication from the device to other devices and determine if such communications are safe, receive communication sent to the device and determine if such communications are safe, or the like.

In some exemplary embodiments, the network security agent may be installed on the "strongest" device in the network, e.g., the device having maximal available computational resources, the device having the stronger CPU, the device connected to electricity, the device with the maximal battery charge, or the like. Additionally or alternatively, the network security agent may be installed on the network, utilizing computational resources of the network, of a server thereof, a server of the operator of the security agents, or the like. Additionally, or alternatively, the agent may be installed on a device different than the target device it is configured to protect. In some exemplary embodiments, by enabling protection for the device, agents installed on other devices may perform a limited security operation, as the target device is not considered as a potential threat. Additionally, or alternatively, traffic to and from the target device may be routed through the different device to enable processing of incoming or outgoing packets. In some cases, the routing may be implemented by the security agent devices which may be made aware of the agents that are deployed off-device. It may be noted that the network security agent may be configured to serve more than one device over the network, such as protecting all the unsecured devices in the network, a portion thereof, or the like. As a result, the network may become more trustworthy due to having some devices installing security agents for other devices, even without the cooperation of those target devices.

One technical effect of utilizing the disclosed subject matter is enabling a safe communication with compromised devices while minimizing utilization of resources for securing such communication. The disclosed subject matter enables devices that are protected with a security agent, to communicate with unprotected devices, without being exposed to security attacks therefrom or being compromised through communications therewith. By enabling the security agent of the device to employ different security policies adapted based on a risk level of the communicating device, and enabling an off-device processing of communication with compromised devices, less resources may be utilized for securing the communications.

Another technical effect of utilizing the disclosed subject matter is enhancing the protection provided by security agent, based on data collected from other agents and provided to a vendor thereof. Such data may be utilized to update security databases, that comprise security measures and rules based on information collected on the unsecured device, up-to-date potential attacks, or the like. The disclosed subject matter enables to generalize the security databases such as to be adapted for types of devices, types of protocols and existence of trusted agents, or the like, and not only for certain device; to enhance the performance of security agents when searching for information related to unsecured devices.

As yet another technical effect of utilizing the disclosed subject matter is improving security of unprotected devices, by utilizing properties of the security agents installed on protected device connected thereto, by providing dedicated security agents for communications therewith, communication through a trusted gateway, and the like. The disclosed subject matter enables installing security agents on unsecured device, without the vendor having a-priori communication therewith. Furthermore, the disclosed subject matter enables providing security agent for unsecured device, even if such devices have limited resources, computation power, or other reasons preventing installing security agents thereon.

As yet another technical effect of utilizing the disclosed subject matter is optimizing the performance and functionality of security agents by sharing security workload therebetween. Creating a mesh network of trusted devices to share resources and allocated them therebetween, optimizes the efficiency of performing security tasks and utilization of resources therefor. Furthermore, the solution provided by disclosed subject matter, enables utilizing resources of trusted servers for performing the security workload, thus causing the devices to become more powerful in processing, storage, functionality, or the like. Furthermore, utilizing trusted mesh network may enable devices to share security tasks or perform such tasks for unprotected devices.

The disclosed subject matter may provide for one or more technical improvements over any pre-existing technique and any technique that has previously become routine or conventional in the art. Additional technical problems, solutions and effects may be apparent to a person of ordinary skill in the art in view of the present disclosure.

Referring now to FIG. 1A showing a flowchart diagram of a method, in accordance with some exemplary embodiments of the disclosed subject matter.

On Step 110, communication between a device and external devices may be monitored, by a security agent installed on the device. In some exemplary embodiments, the external devices may comprise at least a first device and a second device.

In some exemplary embodiments, the security agent may be configured to secure communication of the device. The security agent may be operated by a security platform. The security platform may be configured to automatically analyze the device, using the security agent, to discover and mitigate security gaps, gain physical and digital certification once the device is secure, protect deployed devices against known and unknown threats, expose attack methods targeting the devices with honeypots, gain real-time updates on new vulnerabilities found in the devices, or the like.

On Step 120*a*, a determination that the first device is protected by a trusted security agent may be performed. In some exemplary embodiments, a trusted security agent may be an instance of a base agent, that the security agent is also an instance thereof. Additionally or alternatively, a trusted security agent may be a security agent listed in a list of trusted security agents, published by the same vendor of the security agent of the device, published by a vendor that is listed in a list of trusted vendors, or the like.

On Step 130*a*, a first level of in-device protection may be determined for the first device. In some exemplary embodiments, the first level of in-device protection may be based on the first device protected by the trusted security agent, and accordingly, not compromising the device.

On Step 140*a*, a first security policy may be employed by the security agent, for communications originating from the first device. In some exemplary embodiments, the first security policy may be determined based on the first level of in-device protection. The first security policy may comprise automatically validating communications from the first device, as the first device is protected by the trusted security agent.

On Step 120*b*, a determination that second device is not protected by any security agent that is trusted by the security agent may be performed. In some exemplary embodiments, the second device may not be protected by any security agent, may be protected by un-trusted security agent, or the like.

On Step 130*b*, a second level of in-device protection may be determined for the second device. In some exemplary embodiments, the second level of in-device protection may be based on the identification that the second device not being protected by any trusted security agent, and accordingly, may be potentially compromising for the device.

Accordingly, the second level may be a higher protection level than the first level, as it may not assume any protection from the other side.

In some exemplary embodiments, the second-level of in-device protection may be determined based on vulnerability information associated with devices from a same type of the second device. The vulnerability information may be obtained from a vulnerability database retained by the vendor of the security agent. The vulnerabilities database may comprise a list of vulnerabilities that may be associated with devices from the type of devices, a list of attacks that can work on the device, weaknesses thereof, known security bugs, or the like.

On Step 140*b*, a second security policy may be employed by the security agent, for communications originating from the first device. In some exemplary embodiments, the second security policy may be determined based on the second level of in-device protection. The second security policy may comprise inspecting communications from the second device before being validated, blocking such communication totally or partially, reporting the communication, or the like, as the second device may not be protected by a trusted security agent. Accordingly, the second policy may utilize more resources than the first policy.

In some exemplary embodiments, the second security policy may comprise inducing the second device to install a security agent, such as depicted in Steps 150*b*, 152*b* and 154*b*.

On Step 150*b*, a suggestion to install a new security agent on the second device may be provided. In some exemplary embodiments, the suggestion may be provided to an operator of the second device requesting to install security agent on instances of devices of a type of the second device, including the second device. The suggestion may comprise an indication that the second device is compromised, a notification that the communications from the second device may be blocked unless a security agent is installed thereon, offers of security agents from the vendor of the security agent, or the like. It may be noted that in some cases, even when the suggestion is provided to the vendor, the specific instance (e.g. the second device) may be updated that the first device is requesting, by the specific security agent, to install a security agent thereon, such as directly by the security agent, via the vendor, or the like. In some exemplary embodiments, the suggestion may be provided automatically and directly by the security agent of the device. Additionally or alternatively, the security agent may be configured to report the second device to the operator (e.g. the vendor thereof) and the operator may provide the suggestion. The security agent may be configured to provide to the operator additional information regarding the communication with the second device, such as a location of the unsecured device, connections protocols, or the like. The operator may identify other information about the device, such as a type thereof, an owner or operator, or the like.

On Step 152*b*, a determination that the new security agent is protecting the second device. In some exemplary embodiments, the suggestion to install the new security agent on the second device may be accepted and the new security agent may be installed on the device. Additionally or alternatively, the second device or the operator thereof may not trust operators to automatically deploy security agents thereon. In such cases, an interim solution may be deployed, such as installing the new security agent on another device or a server, or the like.

On Step 154*b*, the first security policy may be employed for communications originating from the second device. In some exemplary embodiments, as the second device may be protected by the new security agent (installed thereon or on another device or server, or the like), the security agent may be configured to trust communications from the second device, as a device protected by a trusted security agent (similar to the communications from the first device). As a result, resource utilization by the security agent may be reduced.

Figure 1B:
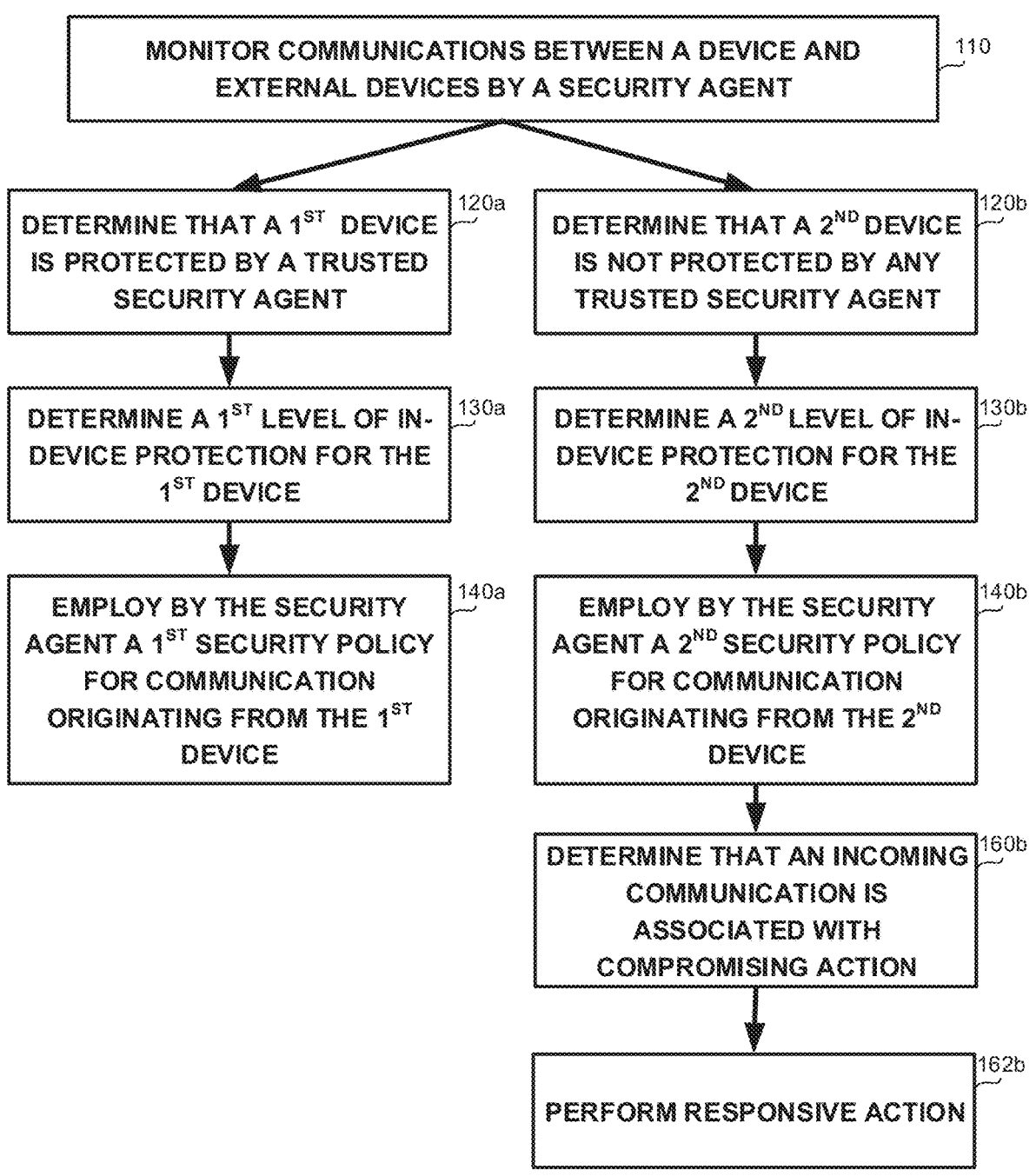

Referring now to FIG. 1B showing a flowchart diagram of a method, in accordance with some exemplary embodiments of the disclosed subject matter.

In some exemplary embodiments, the second security policy may comprise the actions depicted in Steps 160b, and 162b.

On Step 160b, a determination that an incoming communication from the second device is associated with a compromising action. In some exemplary embodiments, the compromising action may comprise an attempt by the second device to scan the device, sending crafted messages to the device, or the like.

It may be noted that the first security policy may exclude such examination action for incoming actions from the first device.

On Step 162b, a responsive action may be performed. The examination ad responsive actions may be performed with respect to communication originating from the second device and may not be performed with respect to communication originating from the first device. In some exemplary embodiments, the responsive action may comprise blocking the communication, enabling partial communication, or the like.

The databases may be retained on the cloud, on a trusted server, on a platform of the vendor of the security agent, or the like. The protected device, or the security agent thereof, may be configured to look for information about the type of devices, type of protocols and existence of trusted agents in the cloud, and accordingly adapt its operation. Additionally or alternatively, the responsive action may be more specific in order to enable a wider communication with the unsecured device, and not blocking all communication therewith. The responsive action may be based on protocols utilized in the connection between the devices, features of the communication, CVE results, or the like. As an example, a responsive action may comprise disabling certain features of protocols utilized for the communication. As another example, the responsive action may comprise allowing only a partial list of actions to the unsecured device.

Figure 1C:
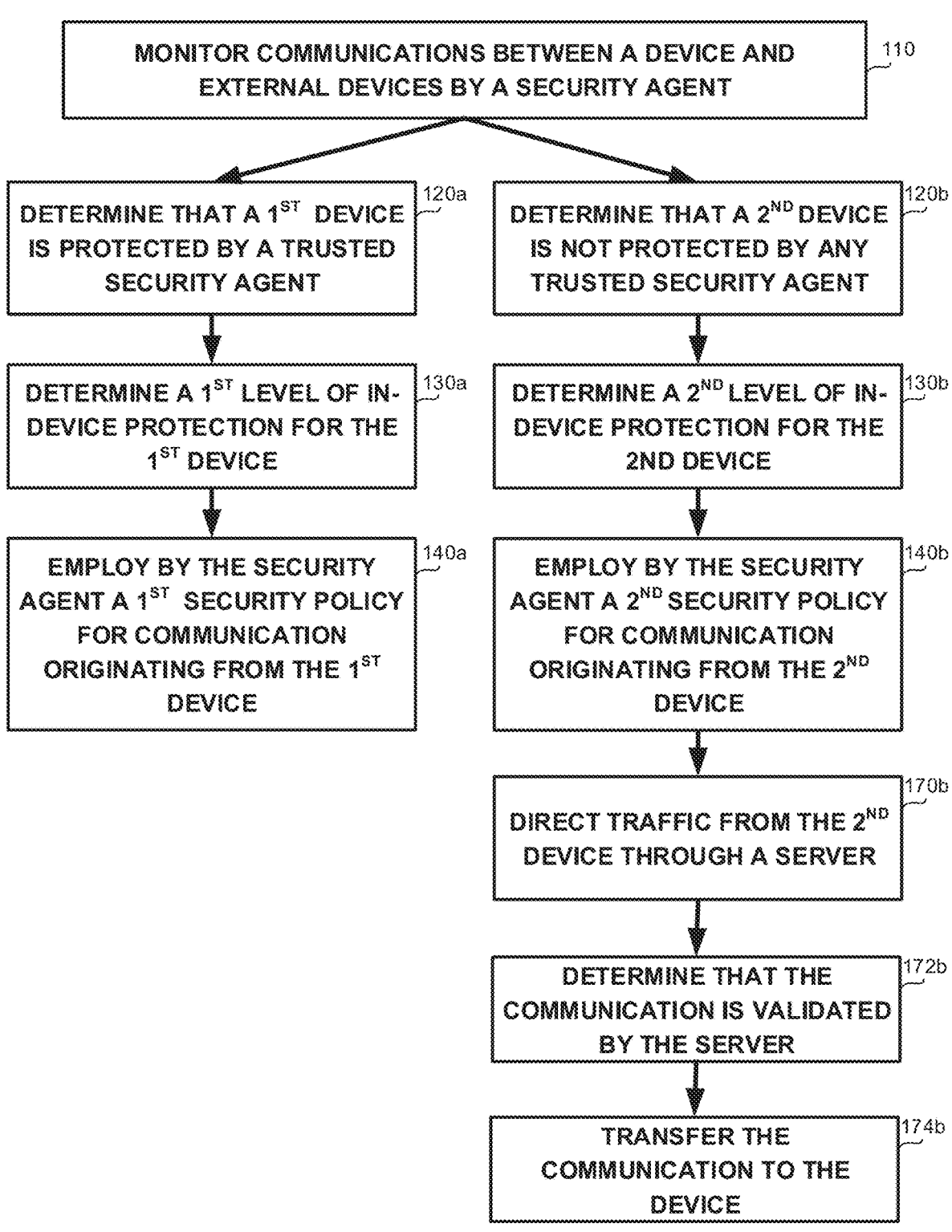

Referring now to FIG. 1C showing a flowchart diagram of a method, in accordance with some exemplary embodiments of the disclosed subject matter.

In some exemplary embodiments, the second security policy may comprise the actions depicted in Steps 170b, 172b and 174b.

On Step 170b, traffic from the second device to the device may be directed through a server. The server may be configured to process communication from the second device to the device to determine validation thereof. In some exemplary embodiments, only a portion of the traffic may be directed to off-device processing by the server, based on the available resources of the device, the type of the traffic, or the like. In some exemplary embodiments, the server may be operated by the operator of the security agent. The communication from device second device may be received by the operator of the security agent and processed by the server.

On Step 172b, a determination that the communication is validated by the server, may be performed. Additionally or alternatively, the communication may not directly be validated by the server. The server may be configured to perform some security actions to provide validated communication to the device. As an example, if the second device is not known to the server, or the connection between the device and the second device is not regular or familiar, the server may be configured to inform the operator of the security agent to get additional feedback, analysis, or the like. As another example, the server may block portions of the communication, restrict some scanning actions, or the like.

On Step 174b, in response to the server validating the communication, the communication may be transferred to the device. Additionally or alternatively, a processed communication may be transferred to the device. As a result, the device may be configured to treat the validated communication as arising from a secured device, and avoid adverse consequences of communication from untrusted source.

Figure 1D:
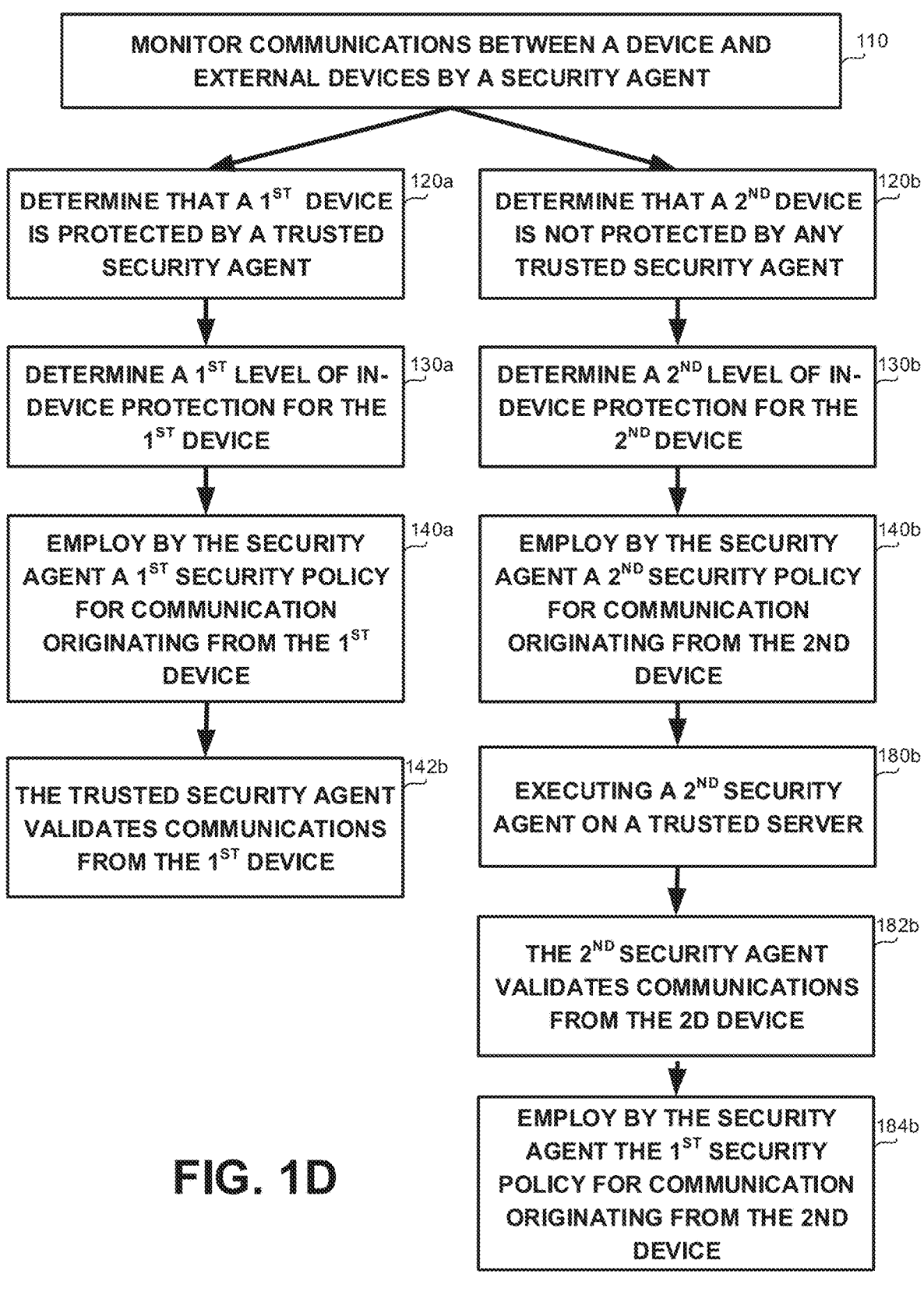

Referring now to FIG. 1D showing a flowchart diagram of a method, in accordance with some exemplary embodiments of the disclosed subject matter.

In some exemplary embodiments, the second security policy may comprise the actions depicted in Steps 180b, 182b, 184b.

In some exemplary embodiments, the second security policy employed on Step 140b may comprise utilizing resources of a trusted server to improve security of the device with respect to communications originating from the second device. The first security policy may be devoid of utilization of the resources of the trusted server.

On Step 180b, a second security agent may be executed on the trusted server. In some exemplary embodiments, the second device may not be capable of installing the security agent, such as due to limited resources. Additionally or alternatively, the second device may not accept the suggestion to install the security agent, such as due to not trusting the vendor thereof, not identifying the request, or the like.

On Step 182b, the second security agent may be configured to validate outgoing communications from the second device. It may be noted that the first device is configured to validate outgoing communications therefrom by the trusted security agent installed thereon (Step 142), and thus may not need to utilize the second security agent.

On Step 184b, in response to utilizing the second security agent, the second security policy may comprise employing the first security policy for communications originating from the second device and tunneled through the server.

Figure 1E:
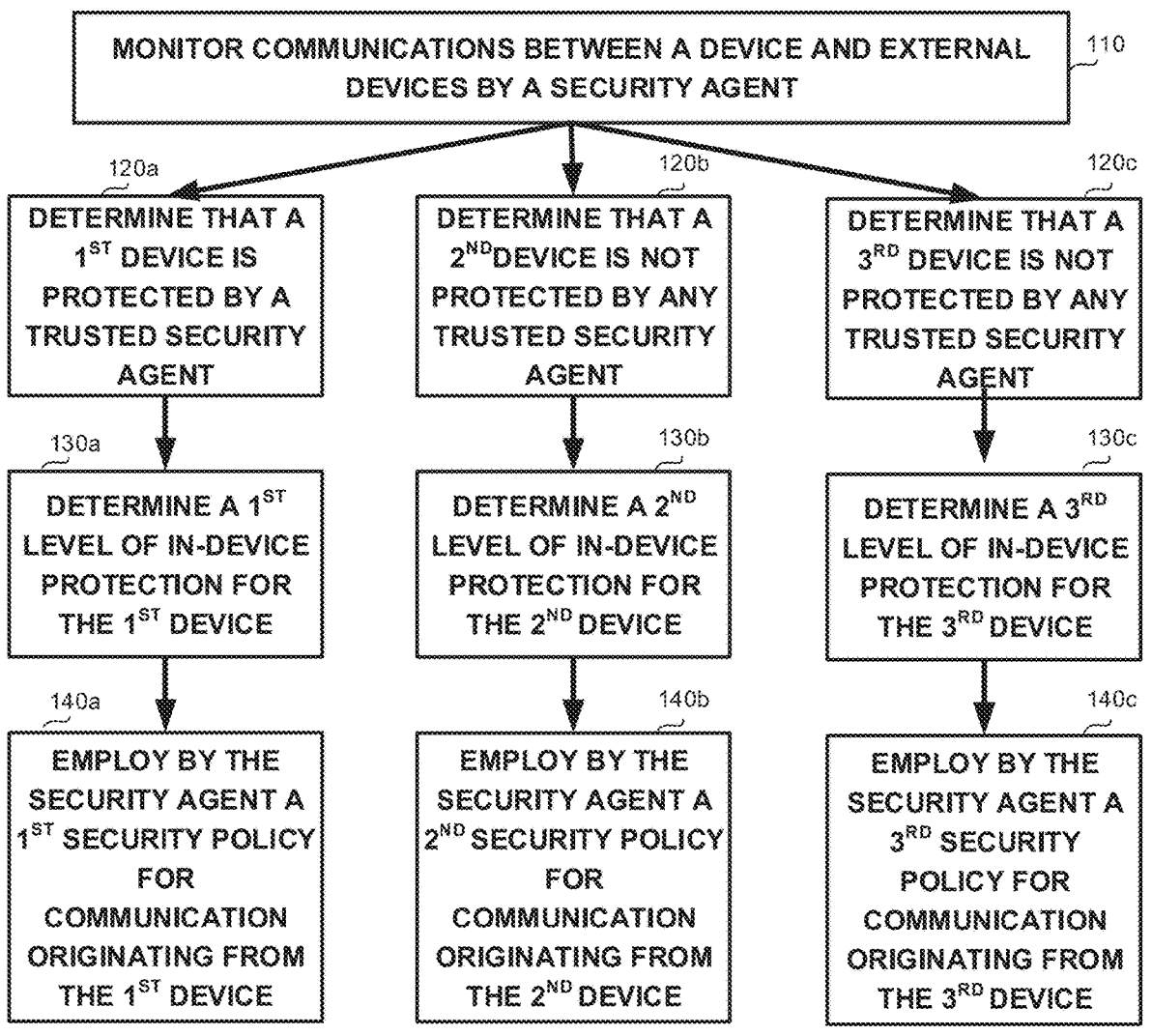

Referring now to FIG. 1E showing a flowchart diagram of a method, in accordance with some exemplary embodiments of the disclosed subject matter.

In some exemplary embodiments, the external devices may comprise a third device.

On Step 120c, a determination that third device is not protected by any security agent that is trusted by the security agent may be performed. In some exemplary embodiments, the third device may not be protected by any security agent, may be protected by un-trusted security agent, or the like.

On Step 130c, a third level of in-device protection may be determined for the third device. In some exemplary embodiments, the third-level of in-device protection may be determined based on vulnerability information associated with devices from a same type of the third device. The vulnerability information may be obtained from a vulnerability database retained by the vendor of the security agent. The vulnerabilities database may comprise a list of vulnerabilities that may be associated with devices from the type of devices, a list of attacks that can work on the device, weaknesses thereof, known security bugs, or the like.

It may be noted that the third level may be a higher protection level than the first level, as it may not assume any protection from the other side. On the other hand, the third security level may be a lower protection level than the second level. Such difference between the second level and the third level may be based on different level of potential vulnerabilities caused by each type of devices to the device. Additionally or alternatively, the difference may occur because of the different devices utilizing different types of communications with the device, different types of modules passed in the communication, different protocols, requesting different types of data, or the like.

On Step 140c, a third security policy may be employed by the security agent, for communications originating from the first device. In some exemplary embodiments, the third security policy may be determined based on the third level of in-device protection. The third security policy may comprise inspecting communications from the third device before being validated, blocking such communication totally or partially, reporting the communication, or the like, as the third device may not be protected by a trusted security agent. Accordingly, the third policy may utilize more resources than the first policy. As an example, the third device may be an IoT device requesting data from the device, such as an air conditioner requesting a desired temperature from a server device of a smart home. Despite such IoT device may not have a trusted security agent, the communication therewith may not be compromising as a communication with an IoT device requesting to modify data, modify a state in the smart home, or the like; or an IoT device requesting personal data, or the like.

Figure 2A:
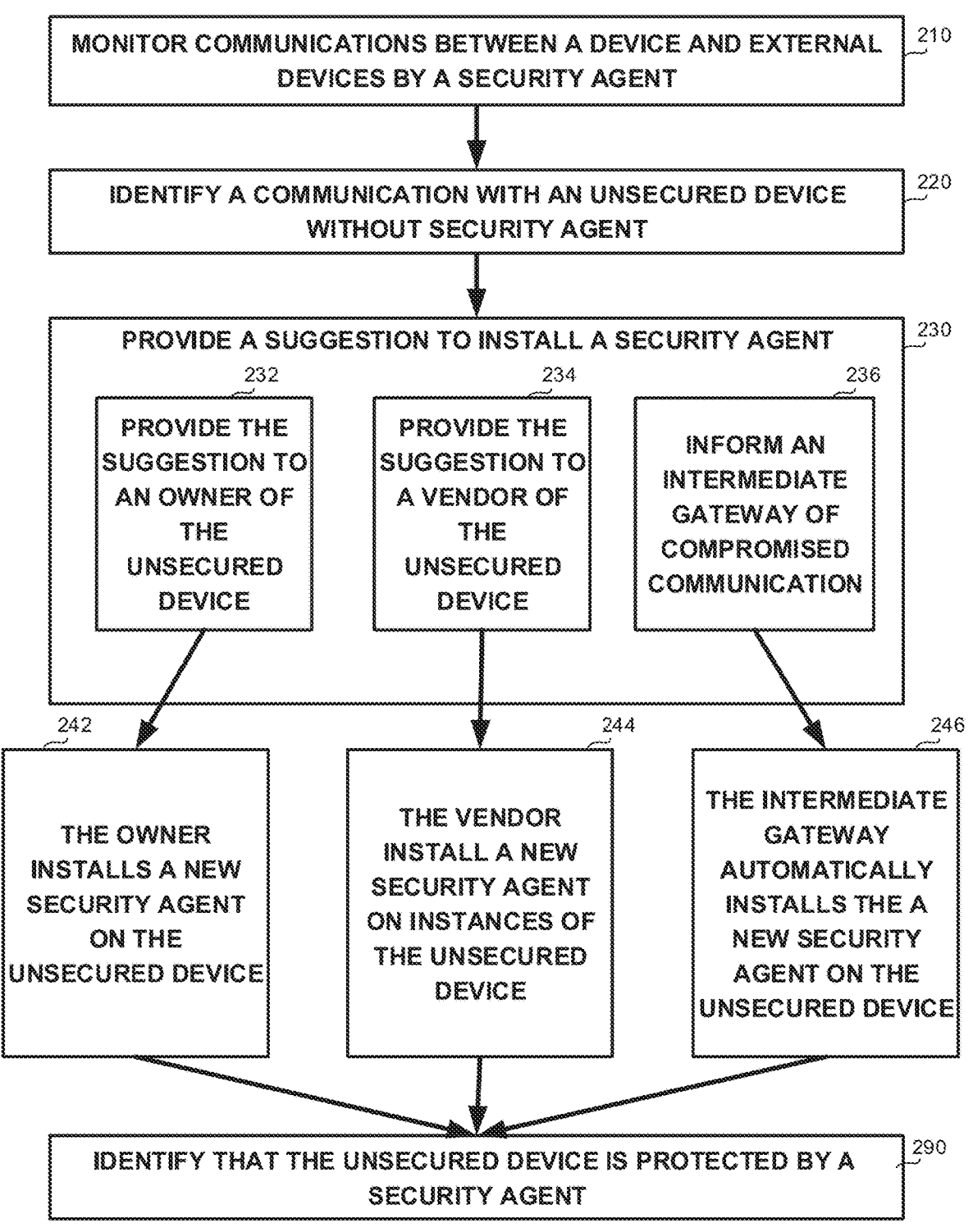

Referring now to FIG. 2A showing a flowchart diagram of a method, in accordance with some exemplary embodiments of the disclosed subject matter.

On Step 210, communication between a device and external devices may be monitored, by a security agent installed on the device. In some exemplary embodiments, the security agent may be configured to secure communication of the device. The security agent may be operated by a security platform. The security platform may be configured to automatically analyze the device, using the security agent, to discover and mitigate security gaps, gain physical and digital certification once the device is secure, protect deployed devices against known and unknown threats, expose attack methods targeting the devices with honeypots, gain real-time updates on new vulnerabilities found in the devices, or the like.

On Step 220, a communication with an unsecured device may be identified. In some exemplary embodiments, the unsecured device may not be protected by any security agent that is trusted by the security agent of the device. In some exemplary embodiments, a certain security agent may be determined to be trusted by the security agent of the device, if the certain security agent and the security agent are instances of a same base agent, if the certain security agent is listed in a list of trusted security agents, if the certain security agent and the security agent of the device are published by a same vendor, or by trusted vendors, or the like.

On Step 230, a suggestion to install a security agent for the unsecured device may be provided. The suggestion may be provided in different options, such as depicted in Steps 232, 234 and 236.

On Step 232, the suggestion may be provided to an owner of the unsecure device. In some exemplary embodiments, the device (or the security agent) may connect to the vendor and provide information about the unsecured device connecting thereto. The information may comprise location of the unsecured device, connections protocols, reasons for why should the unsecured device have a security agent, or the like. The vendor may search for the owner of the unsecured device and convince the owner to install the security agent. As an example, the vendor may search in a registry database whether the device is installed by a certain owner, whether the owner is trusted, whether the owner is informed of devices not in the registry, or the like. In some exemplary embodiments, the suggestion may comprise information about the risk associated with the unsecured device not being protected. The suggestion may be configured to induce the owner to install a security agent on the unsecured device.

Additionally or alternatively, on Step 234, the suggestion may be provided to a vendor of the unsecured device. In some exemplary embodiments, the suggestion may comprise requesting the vendor to install the security agent on instances of devices of a type of the second device.

Additionally or alternatively, on Step 236, the suggestion may be provided to an intermediate gateway. In some exemplary embodiments, the unsecured device or the vendor thereof may not trust operators (such as the vendor of the security device) to automatically deploy security agents thereon. In such cases, an interim solution that suggest communication with the devices through an intermediate gateway, may be deployed. The intermediate gateway may have module of the vendor of the security device installed thereon, to monitor the unsecured device and take actions. Additionally or alternatively, the intermediate gateway may be informed, such as by the security agent or a vendor thereof, of a compromised communication from the unsecured device. As a result, the intermediate gateway may automatically install the new security agent on the unsecured device.

On Step 242, the owner of the unsecured device may install a new security agent on the unsecured device. Additionally or alternatively, on Step 244, the vendor of the unsecured device may install the new security agent on instances of the unsecured device, including the unsecured device. Additionally or alternatively, on Step 246, the intermediate gateway may automatically install the new security agent on the unsecured device or other dedicated device.

On Step 290, an identification that the unsecured device is protected by the new security agent may be performed. In some exemplary embodiments, after determining that the new security agent is protecting the unsecured device, a security policy utilized by the security agent for secured devices, may be employed for communications originating from the unsecured device to reduce resource utilization by the security agent.

Figure 2B:
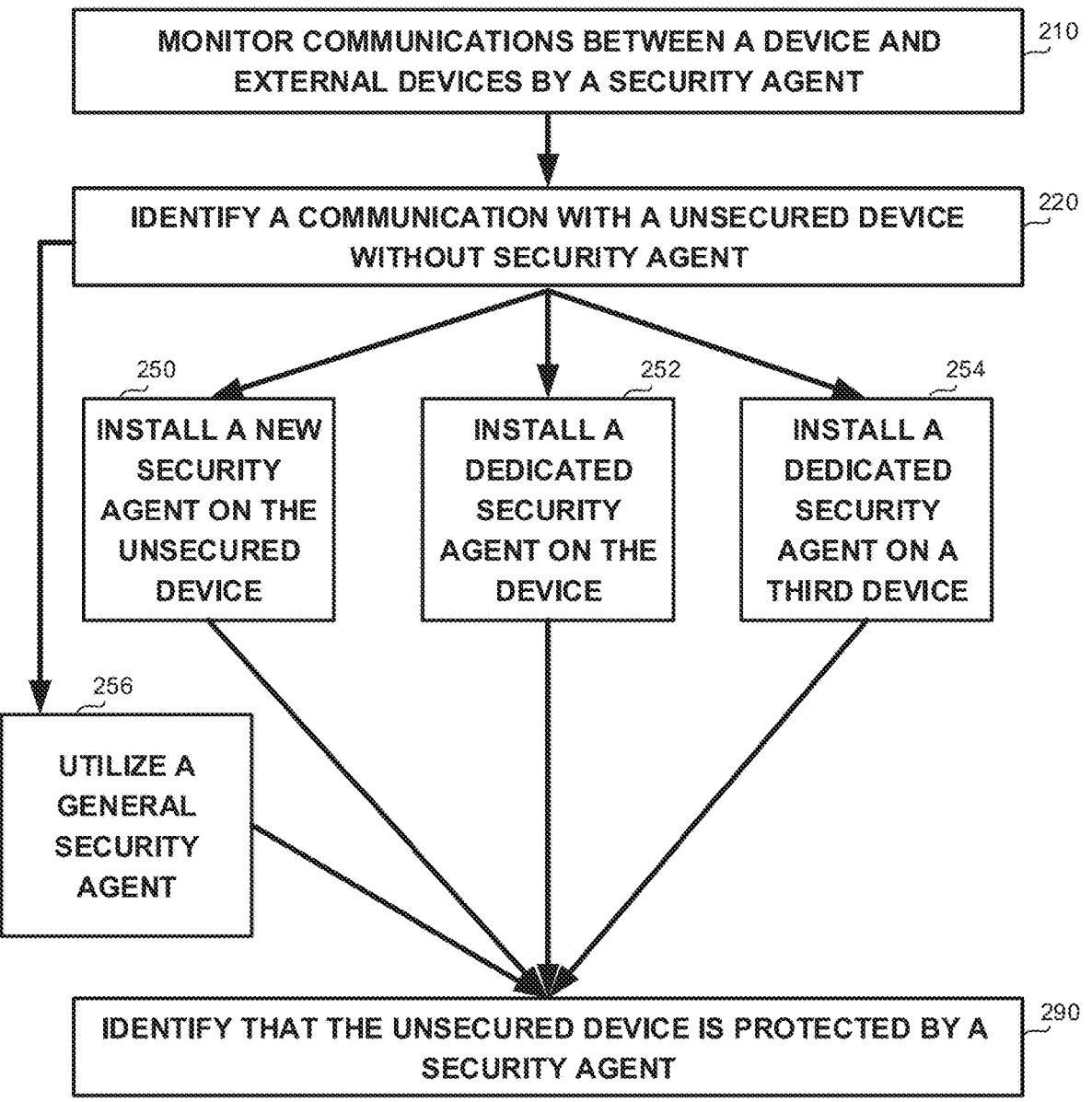

Referring now to FIG. 2B showing a flowchart diagram of a method, in accordance with some exemplary embodiments of the disclosed subject matter.

In some exemplary embodiments, in response to identifying the communication with the unsecured device (Step 220), one or more step of Steps 250, 252, 254 and 256 may be performed.

On Step 250, a new security agent may be installed on the unsecured device. In some exemplary embodiments, the security agent of the device may be configured to report the compromised communication from the unsecured device thereof. The vendor may install a security agent on the device. The vendor may collect information about the device, a type thereof, utilized protocols for communications thereof, potential vulnerabilities, or the like. The vendor may adapt a security agent for the unsecured device based on the collected information.

In some exemplary embodiments, the vendor may identify that it may not be possible to install the new security agent on the unsecured device, such as due to inability to contact the device, to control the device, or the like. Additionally or alternatively, the unsecured device may not be capable for installing the new security agent, such as due to limited resources, or the like. In such cases, the vendor may install the security agent or a simplification thereof, on the device (such as in Step 25), on a server (such as in Step 254), on other device associated with the vendor (such as in Step 254), or the like. Additionally or alternatively, the vendor may adapt a general security agent for securing the communication with the unsecured device (such as in Step 256).

On Step 252, a new security agent may be installed on the device. In some exemplary embodiments, the new security agent may be a dedicated security agent, that may be configured to perform security actions related to only communications between the device and the unsecured device. The dedicated security agent may be configured to process communications originating from the unsecured device, to mitigate the potential risk to the device resulted from the communication from the unsecured device.

Additionally or alternatively, the dedicated security agent may be utilized by other devices connected to the device for communication with the unsecured device, by instances of the device, by instances of the security agent, by the vendor of the security agent (such as for collecting data, updating vulnerability databases, or the like), or the like.

On Step 254, a new security agent may be installed on a third device. In some exemplary embodiments, the third device may be connected to the device, such as directly, via a bus network, or the like. Additionally or alternatively, the third device may be a dedicated device operated by the vendor of the security agent, and utilized for similar tasks, such as installing alternative or dedicated security agents for irregular communication, communication with unprotected devices, or the like. The third device may be a device having sufficient available resources for performing security actions by the new security agent, or a simplification thereof, such as a dedicated security agent.

The new security agent may be configured to process communications originated from the unsecured device to the device, to mitigating the potential risk to the device resulted from the communication from the unsecured. In some exemplary embodiments, the simplification of the new security agent may be performed based on the available resources of the third device, the security requirements for a safe communication with the unsecured device, or the like. As an example, the new security agent may be configured to process only certain types of communications, to monitor only certain protocols, or the like.

Additionally or alternatively, the third device may be a trusted server. The trusted server may be a server connected to the device, connected to the vendor of the security agent, or the like. The trusted server may be trusted by the security agent and vendor thereof, such as due to having a trusted security agent installed thereon, being operated by the same vendor or other trusted vendor, or the like. The trusted device may have sufficient resources for installing the new security agent, to improve security of the device with respect to communications originating from the unsecured device, or the like.

On Step 256, a general security agent may be utilized to secure communications with the unsecured device. In some exemplary embodiments, a general security agent may be operated by the vendor of the security agent or other trusted vendor. The general security agent may be installed on server, on a strong device in a network, on a dedicated device, on a platform of the vendor, or the like.

In some exemplary embodiments, the general security agent may be utilized by other devices for communication with the unsecured device, such as other devices in the same network of the device, other instances of the device, other devices operated by the vendor of the security agent, or the like. Additionally or alternatively, the general security agent may be utilized for communications with other unsecured devices, such as other instances of the unsecured device, other unsecured devices communicating with the device, or the like. In some exemplary embodiments, the general security agent may be modified or adapted by the vendor of the security agent to the communication with the security device, to optimize utilization of resources, by avoiding performing unnecessary tasks, redundant checks, or the like. Such modification or adaptation may be performed based on information provided by the security agent regarding the unsecured device (such as type, vulnerabilities, or the like), communications therewith (such as protocol, pockets, types of commands, or the like), or the like.

Referring now to FIG. 2C showing a flowchart diagram of a method, in accordance with some exemplary embodiments of the disclosed subject matter.

In some exemplary embodiments, providing the suggestion to install a security agent on the unsecured device (Step 230 of FIG. 1A) may comprise performing Steps 260, 262, 264 and 268.

On Step 260, a communication may be initiated from the device to the unsecured device. In some exemplary embodiments, an a-priori protocol between the device and the unsecured device, that enables automated requests may be utilized. In some exemplary embodiments, the communication may include elements such as a URL to a downloadable security agent, a URL to a website enabling integration of the security agent, a text string such as "Please contact VDOO™ to improve the security of your device", or the like.

On Step 262, the unsecured device may identify an irregular communication. In some exemplary embodiments, the communication may be identified as an irregular communication such as because the content of the communication may be irregular or suspicious, the content directly requests reporting to the server, or the like. Additionally, or alternatively, where no such protocol exists, the device may perform an action that may be configured to cause the unsecured device to report an unusual event to its server. As an example, the communication may be impersonated to be directed from another device, not known by the unsecured device, causing the unsecured device to report the unknown device. As an example, the device may misrepresent itself as device X which is not known to the unsecured device. the unsecured device may report such communication to the server. The misrepresentation may be performed by the device pretending to be another device, utilizing other addresses or protocols not known by the unsecured device, or the like.

On Step 264, the unsecured device may report the irregular communication to a server. In some exemplary embodiments, the communication initiated on Step 260, may be configured to cause the second device to identify an irregular communication (step 262) that may induce the unsecured device to report the irregular communication to a server thereof.

On Step 266, the server may process the irregular communication as a request to install the new security agent on the unsecured device. Additionally or alternatively, in case of unusual event reported by the unsecured device, the server may decode the unusual event and may be useful for invoking the server or an operator thereof to download the security agent to the unsecured device, to other instances of the unsecured device, or the like. In some exemplary embodiments, the server may instruct the unsecured device to install a driver or an update. The instruction from the server may comprise an instruction to download the security agent automatically. Additionally, or alternatively, the server may send the security agent to the unsecured device for installation. Additionally, or alternatively, the server may inspect the communication and based thereon may extract an identifier of the device from which the communication originated. The server may examine a lookup table or a web-resource, such as a database indicating which driver is relevant for which device, and identify the security agent to be installed. Additionally, or alternatively, the server may log unusual events in its log for manual inspection. The logged event may include elements from the communication itself.

Figure 3A:
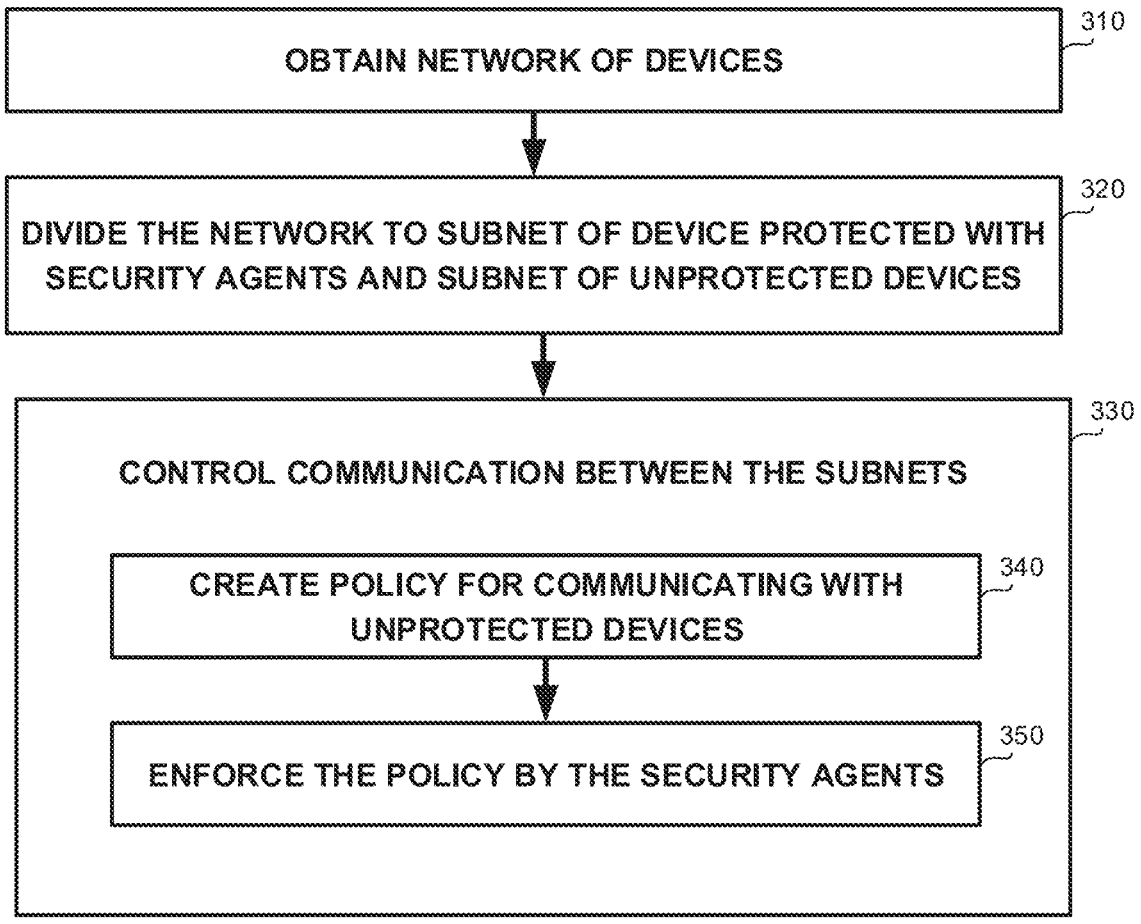
FIGS. 3A-3B show flowchart diagrams of a method, in accordance with some exemplary embodiments of the disclosed subject matter.

Referring now to FIG. 3A showing a flowchart diagram of a method, in accordance with some exemplary embodiments of the disclosed subject matter.

On Step 310, a network of devices may be obtained. In some exemplary embodiments, the network may be a heterogeneous network that comprises both protected devices with security agents, device protected with untrusted security agents, unprotected devices, or the like.

On Step 320, the network may be divided to a first subnet of devices protected by trusted security agents and a second subnet of unprotected device and devices with un-trusted security agents. In some exemplary embodiments, the first subnet of devices may comprise at least one device protected with a security agent. Other devices in the first subnet may be protected with security agents installed thereon, each of which is trusted by the another security agent in the first subnet, such as security agents from the same operator, the same vendor, from trusted vendors, or the like. The second subnet may comprise unprotected devices that may not be associated with any security agent that is trusted by security agents of the first subnet.

Additionally or alternatively, the network may be divided to more than two subnets of devices. One subnet may comprise devices that are not protected by any security agent. Each other subnet may comprise devices that are protected with trusted security agents, such as agents from the same vendor. As an example, the network may be divided into a first subnet of devices protected by security agents from a first vendor (and other trusted vendors), a second subnet of devices protected by security agents from a second vendor (and other trusted vendors), such that the first and the second vendor are not trusted vendors; and a third subnet of unprotected device with no security agents thereon. As another example, the network may be divided into four subnets, comprising the first, second and thirds subnets as the previous example, along with a fourth subnet comprising devices protected by security agents that are not trusted by security agents from the first or second subnets.

On Step 330, communication between the first subnet and the second subnet may be controlled to provide secure communication over the network, while minimizing resources utilization. In some exemplary embodiments, controlling the communication may comprise performing steps 340 and 350.

On Step 340, a policy for communication with unprotected device over the network may be created. In some exemplary embodiments, the policy may be created for each device having a security agent. The policy may define who the device can communicate with and how. The policy may be created by the operator of the security agent and enforced by the security agent.

In some exemplary embodiments, different security policies may be created. As an example, a single user may have a plurality of devices from different vendors and may be required to decide on a policy for communication therebetween. One policy may define how to communicate with devices having a security agent from the same vendor. Another policy may define how to communicate with devices having a security agent from a different (untrusted) vendor. A third policy may define how to communicate with devices without a security agent.

Additionally or alternatively, the policy may be dynamically updated based on shared information between the devices. As an example, if a device with a security agent detects that it is under attack, the device may be configured to inform its operator, other security agents of other devices connected thereto, or the like, about the attack. The policy for such devices may comprise declining communications from the device for a predetermined timeframe, stop assuming that the device is trusted, stop assuming the environment is trusted, execute more validation, restrict one or more functionalities associated with the device, detect more relevant attacks such as in the device or in similar devices, help the device by doing validation for it, stop working with some IP addresses, or the like.

On Step 250, the security policy may be enforced by the security agents. In some exemplary embodiments, the security agents may be configured to enforce security protocols of the operator thereof.

Figure 3B:
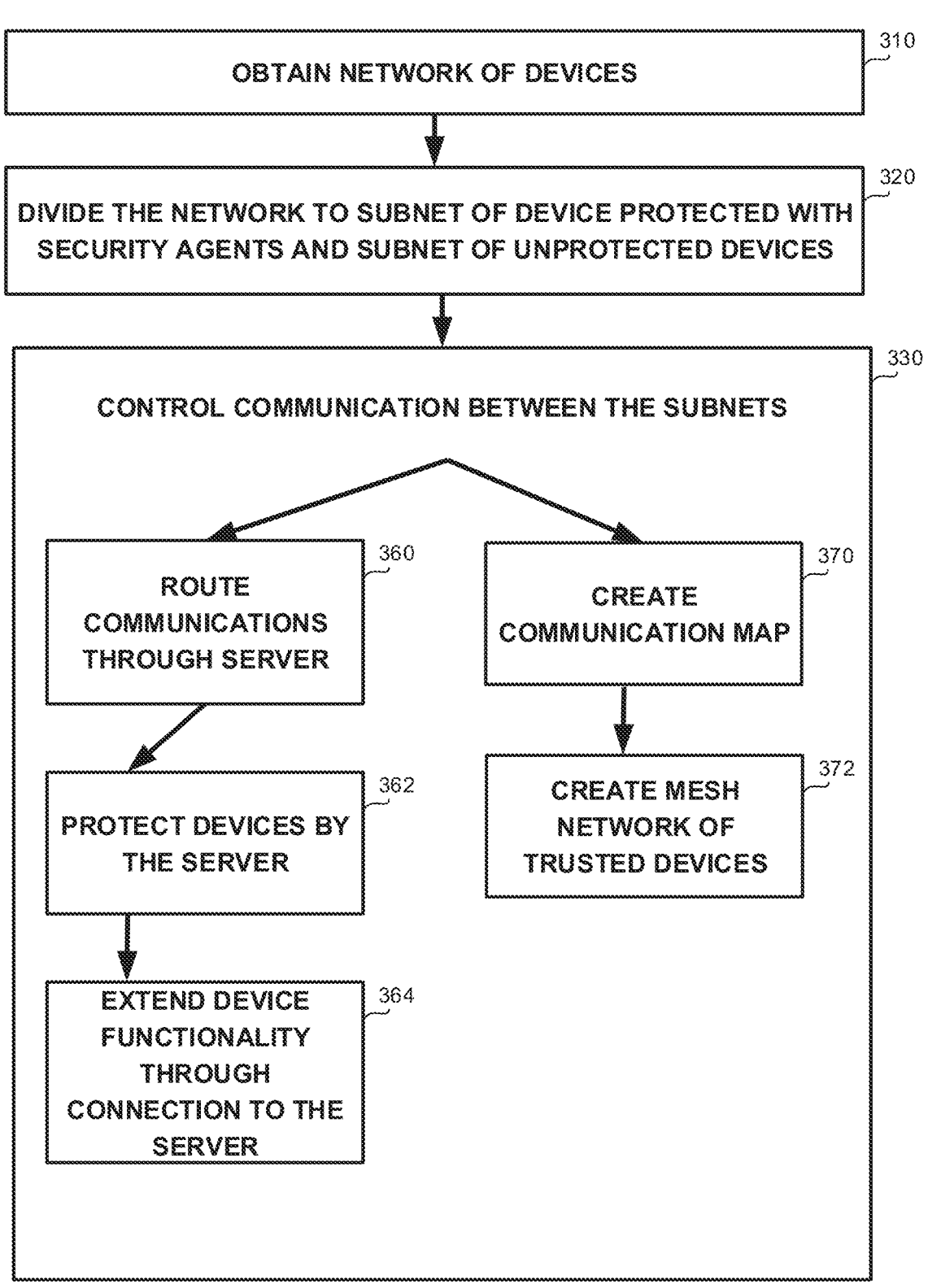

Referring now to FIG. 3B showing a flowchart diagram of a method, in accordance with some exemplary embodiments of the disclosed subject matter.

In some exemplary embodiments, controlling the communication may comprise performing Steps 360, 362 and 364. Additionally or alternatively, controlling the communication may comprise performing Steps 370 and 372.

On Step 360, communications from the second subnet to the first subnet may be routed through a trusted server. In some exemplary embodiments, each communication from an unprotected device from the second subnet to a protected device from the first subnet, may be routed through the trusted server. In some exemplary embodiments, the trusted server may be a device trusted by at least one of the security agents of the first subnet. The trusted server may be configured to validate the communications prior to being passed to the first subnet.

On Step 362, the devices may be protected by the server. In some exemplary embodiments, communication between the first subnet and the second subnet may be controlled via a server to protect all devices having a security agent from the operator. The communication to the devices may be routed through a server of the operator and the device may be protected by the server, which may be stronger devices with lots of capabilities.

On Step 364, the device functionality may be extended through connection to the server. In some exemplary embodiments, by routing the communication through the server and enabling protection for the device, some functions that may have not be allowed for the device, such as due to restricted communication, or limited resources, may now enabled.

On Step 370, a communication map representing the communications between the first and the second subnets may be determined. In some exemplary embodiments, the communication map may comprise communications between security agents, tasks of each agent, or the like. In some exemplary embodiments, security agents on the device may know which other devices they communicate with, type of the communication, how long is the communication, what payload is provided, or the like.

On Step 372, a mesh network of trusted devices may be created based on the communication map. Communications over the mash network may be automatically validated in accordance with the security policy employed for communication with trusted devices. In some exemplary embodiments, information from the communication may be utilized by the operator of the security agents to create a partial map of the that can share workload, trust each other, or the like. It may be noted that the maps may change over time, based on data obtained from the security agents.

In some exemplary embodiments, the mesh network may comprise a first device, a second device and a third device. The first device and the second device may be comprised by the first subnet, e.g. protected by trusted security agents. The third device may be comprised by the second subnet, e.g., not protected by any trusted security agent. The third device may be connected to the second device. Each communication originated from the third device to the first device may be routed through the second device. Accordingly, communications between the third device and the first device, may not be required to be inspected by the first device, as such communications are inspected by the security agent of the second device. As a result, resource utilization by the security agent of the first device may be reduced.

Referring now to FIG. 4A showing a flowchart diagram of a method, in accordance with some exemplary embodiments of the disclosed subject matter.

On Step 410, a connection between a first device and a second device may be identified. In some exemplary embodiments, the first device may be protected by a first security agent installed thereon. The first security agent may be configured to monitor communications between the first device and external devices. The second device may be protected by a second security agent installed thereon. The second security agent may be configured to monitor communications between the second device and external devices.

On Step 420, an identification that the first device is configured to perform a first security workload, and that the second device is configured to perform a second security workload, may be performed. In some exemplary embodiments, the first security workload and the second security workload may comprise tasks and operation related to protecting of the devices, the operation of the security agents, or the like.

On Step 430, at least a portion of the first security workload and the second security workload may be allocated between the first device and the second device. In some exemplary embodiments, each task of the portion may be performed by a single device (e.g., the first device or the second device) to reduce overall resource utilization of the first and second devices in performing the first and second security workloads.

In some exemplary embodiments, the portion of the first security workload and the second security workload may comprise overlapping workload therebetween. An intersection between the first security workload and the second security workload may be identified. The intersection may comprise overlapping workload configured to be performed by the first device and by the second device. As an example, if the first device performs a certain security task related to certain commands, the second device may not perform such security task, to prevent utilizing doubled resources.

Additionally or alternatively, the portion may comprise tasks from on workload (the first workload or the second workload), that cannot be performed by the associated device, due to available resources, capacity, or other reasons. Such tasks may be allocated to the other device.

In some exemplary embodiments, allocating the workload may be performed based on real-time available resources of the first device and the second device. The device with more available resources may be assigned with more tasks, requiring more computations, or the like.

In some exemplary embodiments, allocating the shared workload between connected device may be performed by a workload sharing protocol. Such allocation may be static, e.g., a predetermined allocation may be performed based on features of the connected devices. The workload sharing protocol over the mesh network may comprise, in response to identifying that two connected devices have similar or trusted security agents, deciding using protocols, which device should do what operation or tasks from the workload. Additionally or alternatively, operations or tasks which the protocol does not solve, the shared operator of the security agent may decide how to divide. In some exemplary embodiments, the protocol may have at least two forms. The first form may assume that one device has a security agent while the other is not protected by a trusted security agent. As an example, device A may connect to device B, and may not aware of security agent on device B; device A may run some workload on the security agent thereof to protect from device B and may restrict some options as it does not trust device B. The second form may assume that both devices have similar security agents, and thus device A may run a reduced workload as need less protection from device B and may restrict less functionality as it does trust device B. In some exemplary embodiments, the other device may also perform security checks before accepting sharing workload. As an example, if device A sends commands to device B, device B may run workload to check if the commands are trustable. Device B may also decide what commands or tasks from the workload device A is requesting to share, to perform. As an example, device B may avoid performing tasks or executing commands that can be used to attack other devices. Additionally or alternatively, allocating the workload may be performed dynamically based on real time status of the connected device, such as current available resources, power, or the like. As an example, the allocation may be performed based on the current power situation of the connected devices. The workload may be assigned to the device having more power, more available resources, or the like.

On Step 440, the portion may be performed by a single device (e.g., the first device or the second device), in order to improve efficiency of performing the first security workload and the second security workload.

Additionally or alternatively, a concretized workload may be performed to obtain the same results as performing the portion of the workload of one device by the other device. As an example, the first security workload may be a concretization of the second security workload. The output of the first security workload may be utilized instead of performing the second security workload.

Referring now to FIG. 4B showing a flowchart diagram of a method, in accordance with some exemplary embodiments of the disclosed subject matter.

On Step 450, a mesh network of trusted devices for performing shared security tasks, may be created. In some exemplary embodiments, the first device and the second device may be comprised by the trusted mesh network. The second security agent installed on the second device may be trusted by the first security agent installed on the first device.

On Step 455, an identification that a third security agent installed on a third device is trusted by the second security agent. In some exemplary embodiments, the third device is configured to perform a third security workload.

On Step 460, at least a portion of the first security workload and the third security workload may be allocated between the first device and the third device. In some exemplary embodiments, the third device is enabled to share the third security workload with the first device without determining that the third security agent is trusted by first security agent. In some exemplary embodiments, the mesh network may define the protocol and the division of the operations between the devices, based on a trust level between the security agents, such as enabling controlled sending of workload between devices, preventing sending workload from one device to another, limiting workload to include data files or communication only and not executable files, limiting the communication to pre-defined rules, such as only encrypted communication, avoiding some verification on workload as trusted, allowing functionality not normally allowed as trusted, or the like. As a result, the type and volume of workload that can be shared between the first device and the second device, may be different (e.g., greater, wider, or the like), than of workload that can be shared between the first device and the third device On Step 465, the portion of the workload may be performed by a single device to improve efficiency of performing workload over the mesh network.

Referring now to FIG. 4C showing a flowchart diagram of a method, in accordance with some exemplary embodiments of the disclosed subject matter.

In some exemplary embodiments, a communication between the first device and a fourth device may be identified.

On Step 470, a determination that the fourth device is not protected by any security agent that is trusted by a security agent installed on a device comprised by the mesh network may be performed.

On Step 475, a suggestion to install a new security agent on the fourth device may be provided. In some exemplary embodiments, the suggestion may be provided similarly to Step 230 of FIG. 2A and FIG. 2C.

On Step 480, a determination that the new security agent is protecting the fourth device may be performed.

On Step 485, the fourth device may be added to the trusted mesh network. As a result, the fourth device may be enabled to share security tasks with other devices in the trusted mesh network.

Figure 5:
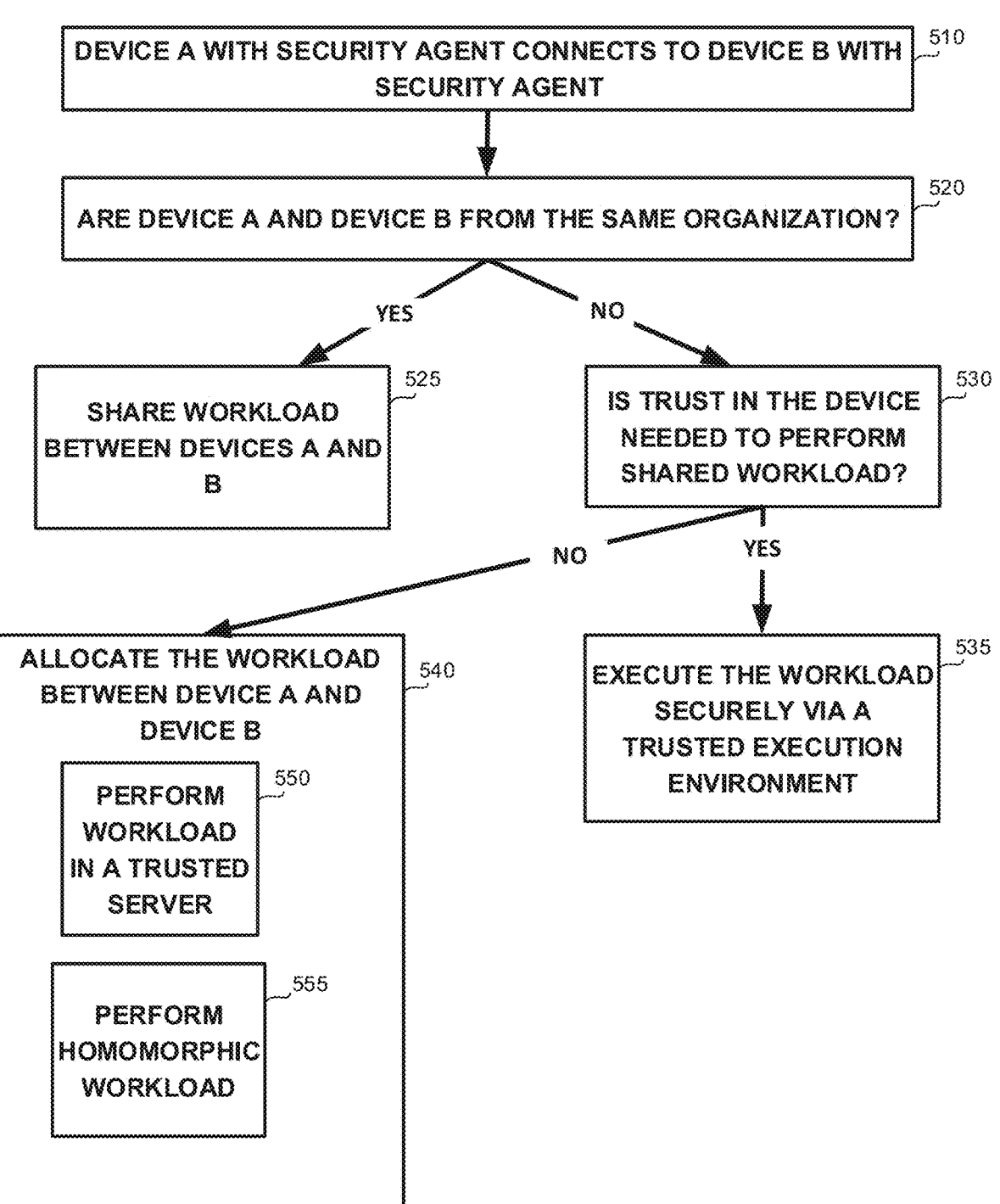
FIG. 5 shows a flowchart diagram of a method, in accordance with some exemplary embodiments of the disclosed subject matter.

Referring now to FIG. 5 showing a flowchart diagram of a method, in accordance with some exemplary embodiments of the disclosed subject matter.

On Step 510, a Device A protected with a security agent installed thereon may connect to a Device B not protected with a security agent.

On Step 520, a determination whether Device A and Device B belong to the same organization, may be performed. In some exemplary embodiments, Device A and Device B may have similar security agents, trusted by each other, such as from the same operator, the same vendors, cooperated vendors, or the like. However, the security agents may not belong to the same owner or vendor, such as instances of a same IoT device from different houses, or the like. Such cases may arise in IoT devices from different organizations that may be connected for performance reasons, and may have similar security agents. The main problem that may arise may be security, e.g., the IoT device may not trust the other side. Even if the IoT device trusts the server, complex computations may be still needed to perform the security sharing.

In case the devices are from the same organization, workload may be shared between Device A and Device B (Step 525). Otherwise, a determination whether a trust in device is required for performing the workload (Step 530).

In case such trust is required, the workload of each device may be performed securely via a trusted execution environment of the device (Step 535).

On Step 540, when the devices are from different organizations, the workload of each device may be performed securely via a trusted execution environment of the device. In some exemplary embodiments, the trusted execution environment may be associated with a vendor of the security agent. The trusted execution environment may enable executing shared workload without providing access from one device to the other.

Otherwise, the first and the second workload may be allocated between the first device and the second device. (Step 540).

In some exemplary embodiments, allocating the workload, and monitoring execution thereof, may be performed in a trusted server (Step 550)

Additionally or alternatively, a homomorphic workload may be performed.

Figure 6A:
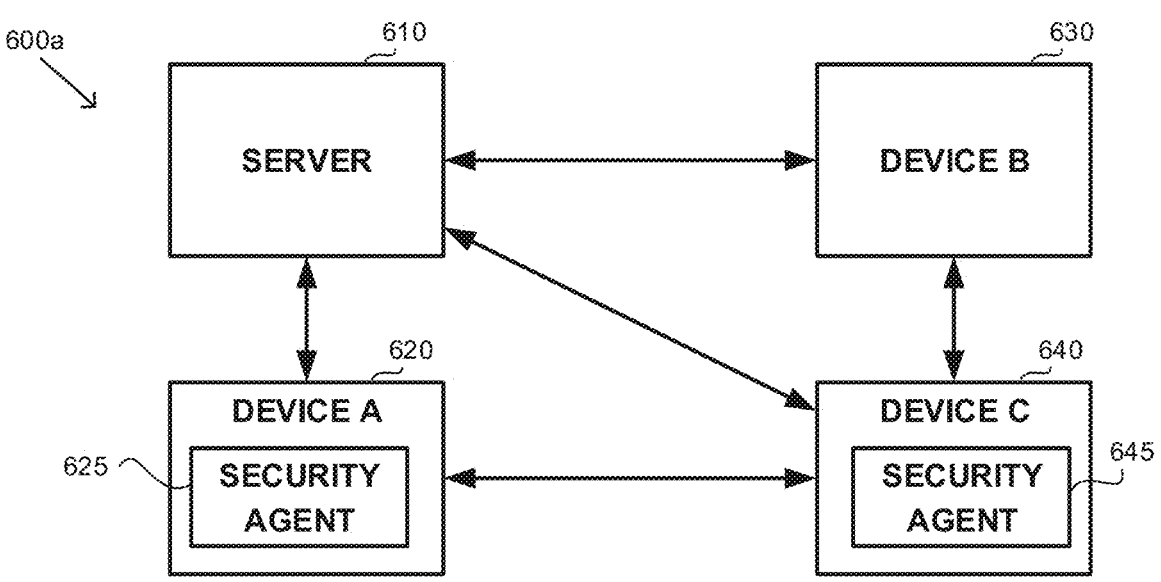
FIGS. 6A and 6B show schematic illustrations of an exemplary architecture, in accordance with some exemplary embodiments of the disclosed subject matter.

Referring now to FIG. 6A showing a schematic illustration of an exemplary environment and architecture in which the disclosed subject matter may be utilized, in accordance with some exemplary embodiments of the disclosed subject matter.

In some exemplary embodiments, a Network 600a of device may comprise a Server 610 and a plurality of devices: Device 620, Device 630 and Device 640. Network 600a may be a heterogeneous network that comprises both secured device, that are protected by security agents installed thereon, such as Device 620 and Device 640 which may be protected by security agents such as Agent 625 and Agent 645 installed thereon; and un-secured devices, such as Server 610 and Device 630, that may not have a security agent installed thereon.

In some exemplary embodiments, Agent 625 installed on Device 620 and Agent 645 installed on Device 640, may be trusted agents. Trusted security agents may be security from the same type, from the same vendor, from trusted vendors, or the like. Trusted security agents may be configured to identify one other, and automatically validate communications provided by associated device thereof. As a result, a communication between Device 620 and Device 640 may not be needed to be validated, and thus the performance of such devices may be improved as less resources are utilized for security validation. On the other hand, such automatic validation, may not be enabled between Device 640 and Device 630.

Additionally or alternatively, trusted security agents may be enabled to share workload related to security therebetween. As an example, Agent 625 and Agent 645 may be configured to cooperate in performing security actions related to the communication between Device 620 and Device 640, to communication with other devices, or the like. As an example, assuming that for security reasons Device 620 and Device 640 are required to check the communication therebetween, it may be sufficient that only one Agent 625 and Agent 645 check the communication and provide the output for the other agent. Additionally or alternatively, other features may be enabled between Device 620 and Device 640 that otherwise may have been disabled, and thus the functionality of the devices may be improved.

In some exemplary embodiments, sharing the workload between Device 620 and Device 640 may be determined based on resources available for each device. As an example, if Device 620 is connected to power, or has more power for temporary reasons (such as in wearable) than Device 640, or the like, it may be configured to perform the shared workload instead of Device 640, such as performing relevant computations required for the communication therebetween, performing security workload from the other device, or the like. Additionally or alternatively, the communication protocol between Device 620 and Device 640 may be configured to decide, using protocols, which device should do what tasks from the workload. Additionally or alternatively, workload or actions that the communication protocol did not solve, may be sent to an operator of Agent 625 and Agent 645 to get additional decision, implementing the decisions, or the like. As an example, unsolved workload may be performed by Server 610.

Additionally or alternatively, sharing the workload between Device 620 and Device 640 may be determined based on communication information available for each device. As an example, if Device 640 connects to device 630 directly, while not identifying a trusted security agent thereon, Device 640 may be configured to employ an advanced security policy, that comprises inspecting every communication with Device 630, which may utilize large amount of resources. Alternatively, Device 640 may rout communications or portions thereof with Device 630 through Device 620. As an example, Agent 625 may be configured to perform cyber security inspection of communications with Device 630 to filter out safe commands to be processed to Device 640, and block or modify other commands, such as commands with potential risk or commands that can be used to attack Device 640, or the like to reduce resource utilization of Device 640. However, inspection of some commands may require communication information available only to Device 640. Such commands may be allocated to Device 640 even if the available resources thereof are lower than the available resources of Device 620.

Figure 6B:
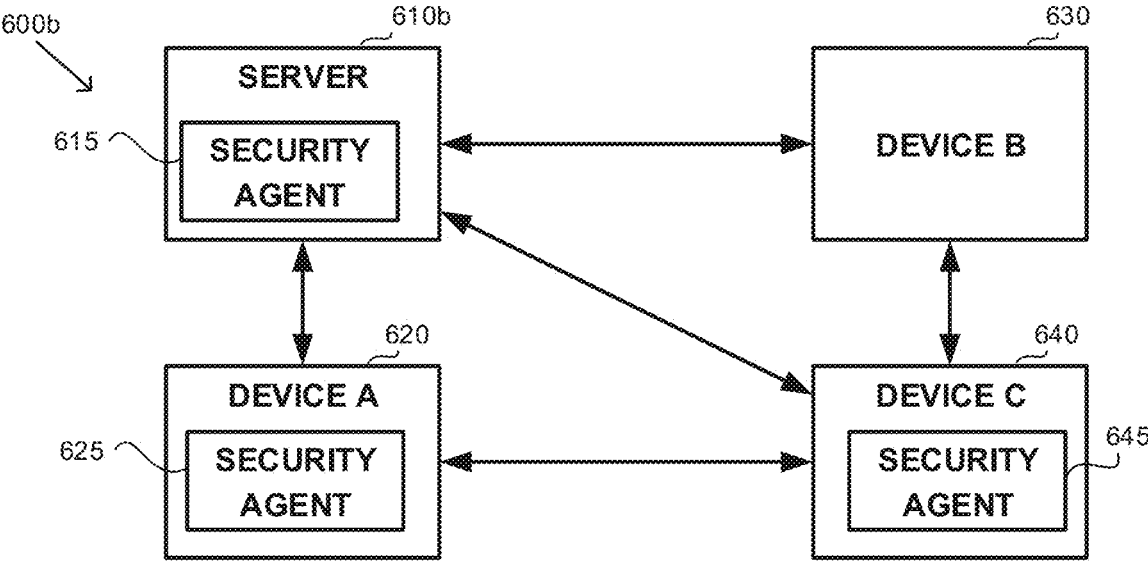

Referring now to FIG. 6B showing a schematic illustration of an exemplary environment and architecture in which the disclosed subject matter may be utilized, in accordance with some exemplary embodiments of the disclosed subject matter.

In some exemplary embodiments, a Network 600b of device may comprise a Server 610b and a plurality of devices: Device 620, Device 630 and Device 640. Network 600b may be a heterogeneous network that comprises both secured device, that are protected by security agents installed thereon, such as Device 620 and Device 640 which may be protected by security agents such as Agent 625 and Agent 645 installed thereon; and un-secured devices, Device 630, that may not have a security agent installed thereon. Network 600b may be similar to Network 600a of FIG. 6A, with Server 610b being protected by a security Agent 615 installed thereon.

In some exemplary embodiments, security validation of communications originating from un-secured devices, such as Device 630, without trusted security agents thereon, may be performed, at least partially, in Server 610b and off-device with respect to the device receiving the communication. Agent 615 may be configured to check such communications before being forwarded back to the relevant device. As an example, Device 640 may be configured to direct traffic from Device 630 through Server 610b. Server 610b may be configured to process communication from Device 630 to Device 640 to determine validation thereof. Communications that are validated by Server 610b may be transferred to Device 640. Additionally or alternatively, some communications may be automatically validated by Device 640 without being directed to Server 610b, such as safe commands, communication through secured protocols, or the like.

Figure 7A:
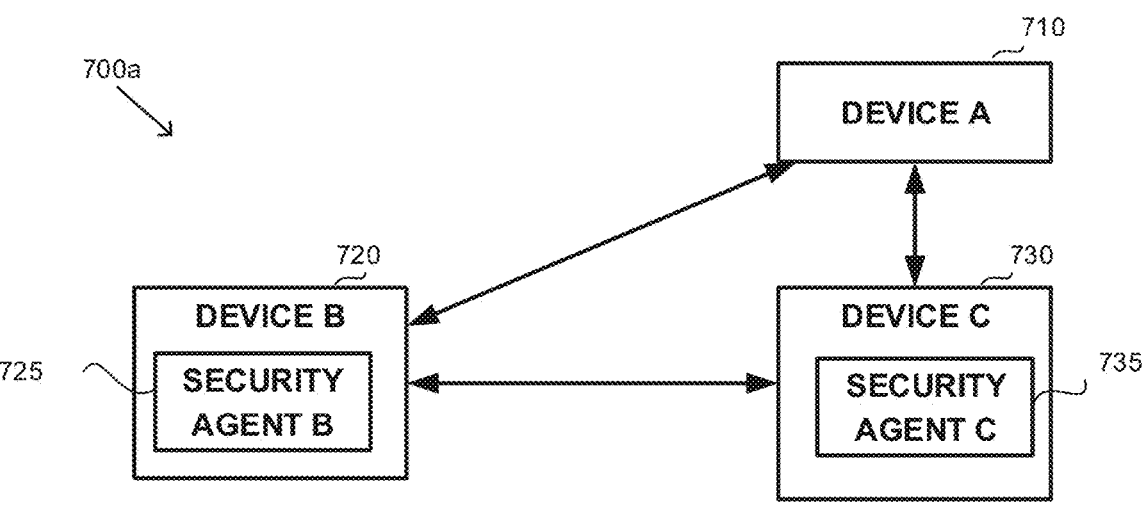
FIGS. 7A-7C show schematic illustrations of an exemplary architecture, in accordance with some exemplary embodiments of the disclosed subject matter.

Referring now to FIG. 7A showing a schematic illustration of an exemplary environment and architecture in which the disclosed subject matter may be utilized, in accordance with some exemplary embodiments of the disclosed subject matter.

In some exemplary embodiments, a Network 700a of device may be a heterogeneous network that comprises both secured device, that are protected by security agents installed thereon, such as Device 720 and Device 730 which may be protected by security agents such as Agent 725 and 735; and un-secured devices, such as Device 710, that may not have a security agent installed thereon.

In some exemplary embodiments, Agent 725 may be configured to monitor communications between Device 720 and external devices, such as Device 710 and 730. Agent 725 may be configured to perform other security tasks for Device 720, such as protecting the device, assisting in performing task, or the like.

In some exemplary embodiments, a first level of in-device protection for may be determined for Device 710, and a second level of in-device protection for the Device 730. The first level may be a higher protection level than the second level. Accordingly, Agent 725 may be configured to employ a first security policy for communications originating from Device 710, and a second security policy for communications originating from Device 730. The first second policy may utilize more resources of Device 720 than the second security policy, as Device 710 may not be protected by any security agent that is trusted by Agent 725.

As an example, Device 720 may be a server and Device 710 may be a camera. Device 720 may have an access to information or data from Device 710. Device 720 may be configured to identify Device 710 and properties related thereto, such as that Device 710 not having a security agent installed thereon. However, Agent 725 may not be configured to monitor the communications between Device 720 and Device 710, as it may be configured to protect Device 720 and not Device 710.

Figure 7B:
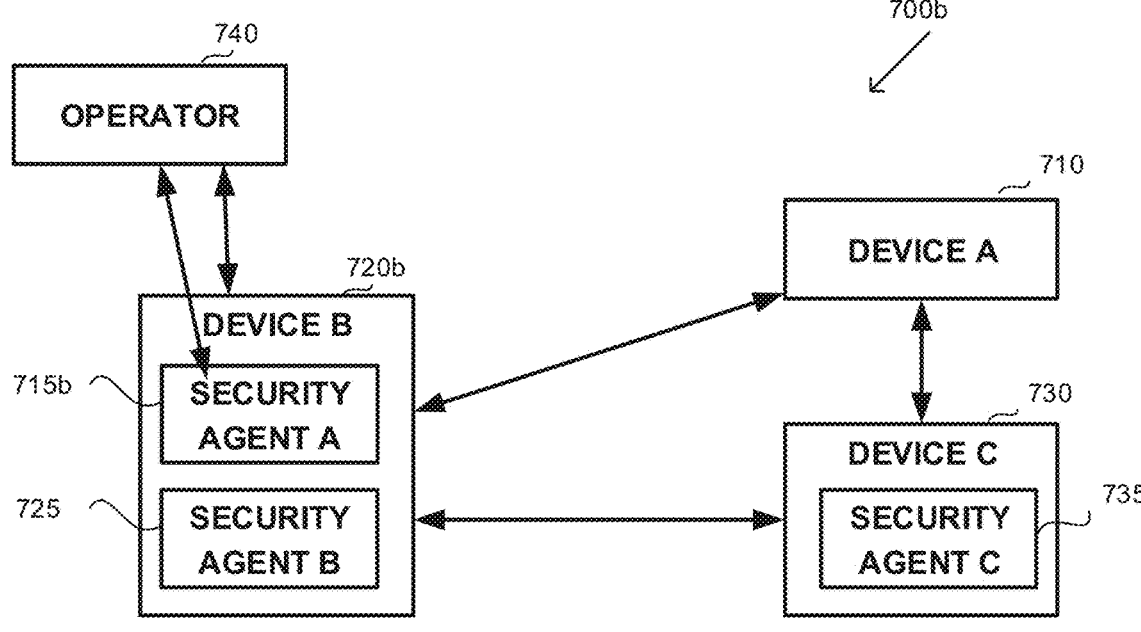

Referring now to FIG. 7B showing a schematic illustration of an exemplary environment and architecture in which the disclosed subject matter may be utilized, in accordance with some exemplary embodiments of the disclosed subject matter.

In some exemplary embodiments, Network 700b may be similar to Network 700a, while suggesting a security policy for communication between Device 720 and Device 710.

In some exemplary embodiments, Agent 725 may be configured to report to an Operator 740 thereof (e.g., VDOO™ Server) about the potentially compromising communication with Device 710, informing Operator 740 that Device 710 is not protected by a trusted security agent, requesting a security agent for handling communications with Device 710, or the like. Operator 740 may attempt to install a security agent on Device 710, in order to reduce the risk for Device 720, to improve cyber security over Network 700*b*, or the like. However, such attempts may not always be feasible. In some cases, Operator 740 may not have information about the owner or operator of Device 710 to suggest installing the security agent on Device 710. Additionally or alternatively, Device 710 may be incapable of installing a security agent thereon, such as because of limited resources, limited computational power, limited control, or the like.

In some exemplary embodiments, Operator 740 may be configured to determine whether a security agent can be installed on Device 710, otherwise Operator 740 may be configured to generate a simplified security Agent 715*b* for Device 710 that can be installed on Device 720. Agent 715*b* may be a dedicated security agent, configured to secure the communication between Device 710 and Device 720. Operator 740 may install Agent 715*b* on Device 720 to be used for Device 710 when communicating therewith. Agent 715*b* may behave as a security agent of Device 710, particularly with communications with Device 720. Agent 715*b* may be configured to process communications originating from the Device 710 to Device 720, to mitigating the potential risk to the Device 720 resulted from the communication from Device 710. As an example, communication protocols that are not used between Device 710 and Device 720, may not be handled by simplified remote Agent 715*b*.

In some exemplary embodiments, Agent 715*b* may be a partial security agent that performs partial security services such as "informing" Device 720 it can trust Device 710 for certain operations, monitoring communications to determine whether Device 710 is being attacked through Device 720, or the like. Additionally or alternatively, Agent 715*b* may be configured to actively check if Device 710 is being compromised, such as by communicating with Device 710 and evaluating responses and response time. The evaluation may be used by Device 720 when deciding how to communicate with Device 710. Agent 715*b* may be configured to report suspected communication to Operator 740.

Additionally or alternatively, Agent 715*b* may be a limited security agent. As an example, Agent 715*b* may not be able to access or use the internal state or internal resources of Device 710. However, Agent 715*b* may be configured to dynamically investigate Device 710 in order to identify when Device 710 is compromised. As another example, simplified security Agent 715*b* may be configured to determine that Device 710 reacts differently to some queries, such as from certain devices, containing certain content, sent in a certain timing, or the like. As yet another example, Agent 710 may be configured to determine that the timing of response of Device 710 to some queries, or some devices, containing certain content is different.

In some exemplary embodiments, in view of the deployment of Agent 715*b*, Agent 725 may avoid performing functionality that is aimed to prevent Device 720 from being compromised in view of traffic received from Device 710 (e.g., stop employing the first security policy and employing the first security policy instead). This can be avoided as Device 720 may be considered as being protected and not compromised. In some exemplary embodiments, a limited functionality, an altered functionality, or the like may be performed instead of avoiding performing any functionality whatsoever (e.g. employing a third security policy, such as a limited version of the first security policy, or the like). As an example, Agent 722 may be configured to perform tasks that are non-resource intense such as tasks that require memory requirement below a threshold, CPU utilization requirements below a threshold, bandwidth requirements below a threshold, or the like.

In some exemplary embodiments, Agent 715*b* may be deployed on a plurality of devices. As an example, Device 730 may also request Operator 740, such as via Device 720, for a security agent for communication with Device 710. The same or a different agent may be provided thereto, in accordance with the disclosed subject matter, and based on the properties of the two devices. In some cases, the security functionality related to Device 710 may be performed off-device by several devices, each of which protecting a different source device, independently.

Figure 7C:
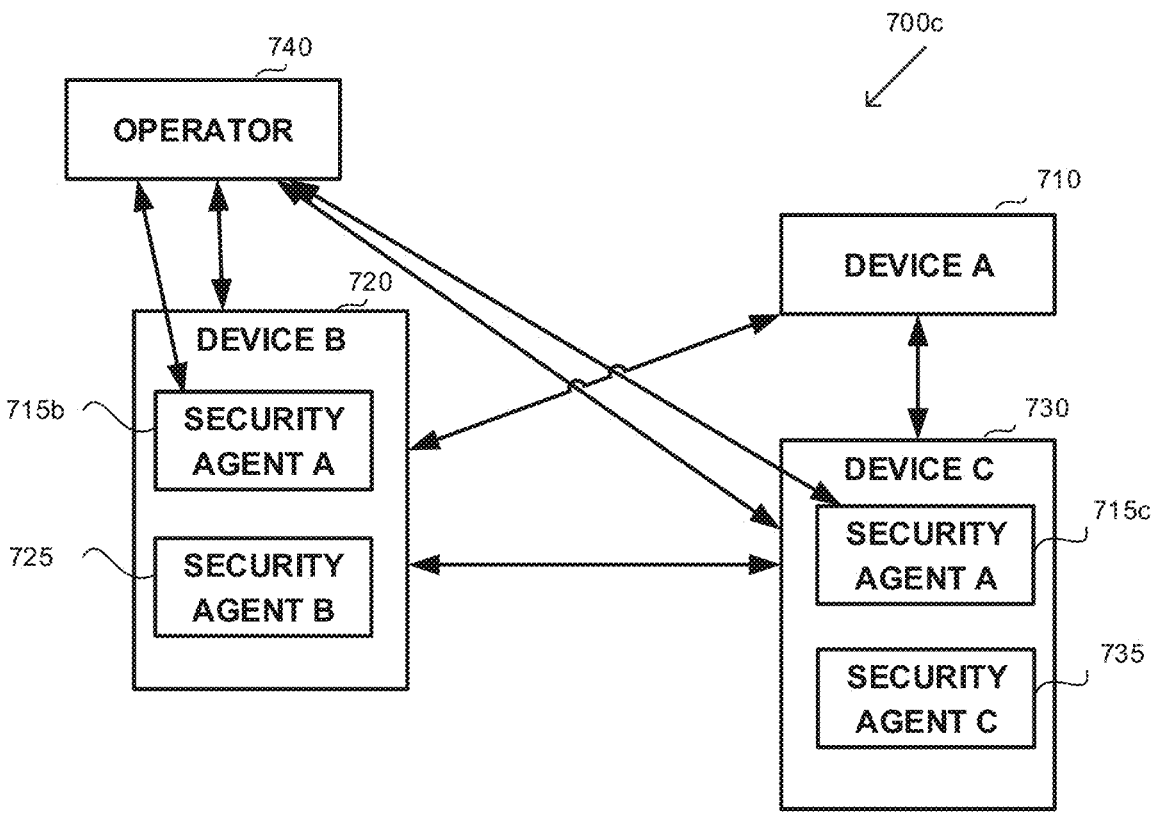

Referring now to FIG. 7C showing a schematic illustration of an exemplary environment and architecture in which the disclosed subject matter may be utilized, in accordance with some exemplary embodiments of the disclosed subject matter.

In some exemplary embodiments, Network 700*c* may be similar to Network 700*a*, while suggesting a different security policy for communication between Device 720 and Device 710.

In some exemplary embodiments, Agent 735 may also be operated by Operator 740, or an operator trusted thereby. Agent 735 may be configured to report the potentially compromising communication with Device 710 to Operator 740, informing Operator 740 that Device 710 is not protected by a trusted security agent, requesting a security agent for handling communications with Device 710, or the like. Operator 740 may install a simplified security Agent 715*c* on Device 730. Agent 715*c* may be similar to Agent 715*b*. Additionally, or alternatively, Agent 715*c* may be different than Agent 715*c*. The difference may be due to the different source device, different communication modules, different protocols, or the like. As an example, if Device 730 and Device 720 employ different protocols when communicating with Device 710, the respective agents may be configured to analyze only the relevant protocol for the communication therebetween, and my thus be different. Additionally, or alternatively, even if the two devices are identical, the agents may process a same packet differently, such as in view of a tacked state between the two respective devices. In some exemplary embodiments, Agent 715*b* may be configured to track the state of the communication protocol between Device 710 and Device 720, while Agent 715*c* may be configured to track the state of the communication protocol between Device 710 and Device 730. In view of the different tracked states, different processing may be performed for the same packet. As an example, if Device 710 and Device 720 have performed a handshake, a new packet may be processed differently by Agent 715*b* than by Agent 715*c* if the same packet is sent to Device 730, in view of the fact that Device 710 and Device 730 have not yet completed the handshake operation.

Figures 8A, 8B:
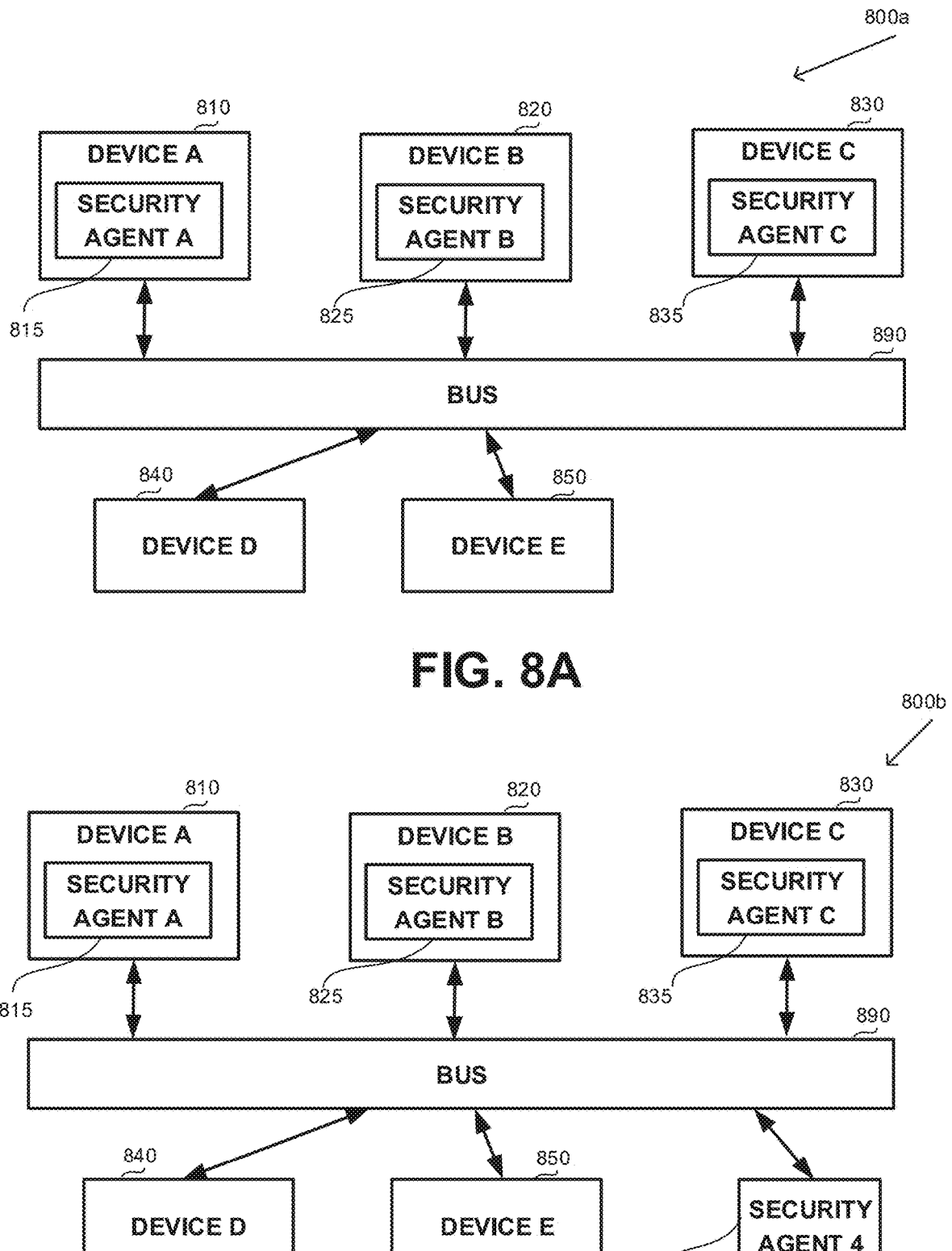
FIGS. 8A and 8B show schematic illustrations of an exemplary architecture, in accordance with some exemplary embodiments of the disclosed subject matter.

Referring now to FIG. 8A showing a schematic illustration of an exemplary environment and architecture in which the disclosed subject matter may be utilized, in accordance with some exemplary embodiments of the disclosed subject matter.

In some exemplary embodiments, a Network 800*a* may comprise a plurality of devices communicating therebetween, such as Device 810-Device 850. Devices 810-850 may be directly connected to a Bus 890 that links between the devices. Bus 890 may be configured to receive all network traffic. Network 800*a* may be a heterogeneous network that comprises both secured and un-secured devices, such as Device 810, Device 820 and Device 830 which may be protected by security Agent 815, Agent 825 and Agent 835, respectively, while Device 840 and Device 850 may not have security agents installed thereon. Each security agent may be configured to perform the full tasks of security agents on the associated devices, such as monitoring the communications thereof, protecting the device, assisting in performing some task, or the like.

In some exemplary embodiments, Device 810 may not trust Device 840, may trust Device 840 partially, or the like. Device 810 may ask the operator (not shown) of its security agent (e.g., Agent 815) to provide a security agent for Device 840.

Referring now to FIG. 8B showing a schematic illustration of an exemplary environment and architecture in which the disclosed subject matter may be utilized, in accordance with some exemplary embodiments of the disclosed subject matter.

In some exemplary embodiments, Network 800b may be similar to Network 800a, while suggesting a different security policy for communication over the network.

In some exemplary embodiments, the operator of Agent 815 (not shown) may create a security Agent 845b for Device 840. Agent 845 may be installed on a server of the operator, on any of Devices 810-850 in Network 800b, such as the strongest device, a device having resources above a predetermined threshold, a device having available resources above a predetermined threshold, or the like.

In some exemplary embodiments, when Device 810 communicates with Device 840, Agent 815 may check with Agent 845b if the communication is safe, and treat Agent 845b as a remote security agent of Device 840. Additionally or alternatively, Agent 845b may be a limited security agent. Agent 845b may be configured to dynamically investigate Device 840 in order to identify when Device 840 is compromised. As an example, Agent 845b may not be able to access or use the internal state or internal resources of Device 840.

In some exemplary embodiments, security agents, such as Agents 815, 825 and 835 may be configured to route packets received from Device 840 to be analyzed by Agent 845b. Additionally, or alternatively, the security agents may be configured to route outgoing packets directed at Device 840 to be processed by Agent 845b before being communicated to Device 840, which may unaware of the existence of Agent 845b. In some exemplary embodiments, re-routing is achieved by Network 800b itself, such as by implanting Agent 845b as a proxy of Device 840.

In some exemplary embodiments, Agent 845b may be utilized by other devices protected by security agents trusted by Agent 815 of Device 810, for communication with Device 840. Additionally or alternatively, Agent 845b may be utilized as network security agent for all devices in Network 800b, on communication with Device 840. Agent 845b may be configured to monitor Device 840, ask questions about Device 840, obtaining information about Device 840, communicating with Device 840, or the like. Additionally or alternatively, Agent 845b may be configured to reply to questions (e.g., queries, requests, or the like) from Agents 815, 825 and 835 to inform them whether a certain communication with Device 840 is safe.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:

identifying a connection between a first device and a second device, wherein the first device is protected by a first security agent installed thereon, wherein the first security agent is configured to secure communications between the first device and first external devices, the first external devices comprising at least one device not protected by any security agent that is trusted by the first security agent, wherein the second device is protected by a second security agent installed thereon, wherein the second security agent is configured to secure communications between the second device and second external devices, the second external devices comprising at least one device not protected by any security agent that is trusted by the second security agent, wherein the first device is allocated to perform a first security workload comprising protecting from security risks associated with any of the first external devices, wherein the second device is allocated to perform a second security workload comprising protecting from security risks associated with any of the second external devices, and wherein the first security workload and the second security workload comprise an overlapping workload;

in response to determining that the first device and the second device have trusted security agents, wherein the trusted security agents are instances of a base agent, changing allocation of at least a portion of the first security workload and the second security workload between the first device and the second device based on the overlapping workload, wherein said allocating further comprises allocating at least a portion of the first security workload and a third security workload between the first device and a third device, wherein the third device is protected by a third security agent installed thereon, wherein the third device is enabled to share the third security workload with the first device without determining that the third security agent is trusted by the first security agent, and instructing the first security agent and the second security agent to perform tasks according to the changed allocation, whereby improving efficiency of performing the first security workload and the second security workload.

2. The method of claim 1 further comprises:

determining an intersection between the first security workload and the second security workload, wherein the intersection comprises the overlapping workload which is configured to be performed by the first device and by the second device;

wherein the portion of the first security workload and the second security workload comprises the overlapping workload; and wherein said allocating defines that each task of the overlapping workload is performed by a single device, whereby reducing overall resource utilization of the first and second devices in performing the first and second security workloads.

3. The method of claim 1, wherein said allocating is performed based on real-time available resources of the first device and the second device.

4. The method of claim 1, wherein the first security workload is a concretization of the second security workload, wherein said allocating comprises determining to perform the first security workload and not the second security workload, wherein the method further comprises utilizing an output of the first security workload instead of performing the second security workload.

5. The method of claim 1, wherein the first device and the second device are comprised by a trusted mesh network;

wherein the second security agent is trusted by the first security agent;

wherein the trusted mesh network comprises the third device, wherein the third security agent is configured to monitor communications between the third device and third external devices, wherein the third security agent is trusted by the second security agent; and wherein the third device is configured to perform a third security workload;

whereby improving efficiency of performing the first security workload.

6. The method of claim 5 further comprises:

identifying a communication between the first device and a fourth device;

determining that the fourth device is not protected by any security agent that is trusted by a security agent installed on a device comprised by the trusted mesh network;

providing a suggestion to install a new security agent on the fourth device; and after determining that the new security agent is protecting the fourth device, adding the fourth device to the trusted mesh network, whereby enabling the fourth device to share security tasks with other devices in the trusted mesh network; whereby reducing resource utilization by security agents of devices in the trusted mesh network.

7. The method of claim 1, wherein changing the allocation is performed by a workload sharing protocol.

8. The method of claim 1, comprising: installing a simplified security agent on the first device, and using the simplified security agent for a fourth device when the fourth device is communicating with the first device, wherein the fourth device is not protected by a trusted security agent.

9. A computer program product comprising a non-transitory computer readable storage medium retaining program instructions, which program instructions when read by a processor, cause the processor to perform a method comprising:

identifying a connection between a first device and a second device, wherein the first device is protected by a first security agent installed thereon, wherein the first security agent is configured to secure communications between the first device and first external devices, the first external devices comprising at least one device not protected by any security agent that is trusted by the first security agent, wherein the second device is protected by a second security agent installed thereon, wherein the second security agent is configured to secure communications between the second device and second external devices, the second external devices comprising at least one device not protected by any security agent that is trusted by the second security agent, wherein the first device is allocated to perform a first security workload comprising protecting from security risks associated with any of the first external devices, wherein the second device is allocated to perform a second security workload comprising protecting from security risks associated with any of the second external devices, wherein the first security workload and the second security workload comprise an overlapping workload;

in response to determining that the first device and the second device have trusted security agents, wherein the trusted security agents are instances of a base agent, changing allocation of at least a portion of the first security workload and the second security workload between the first device and the second device based on the overlapping workload, wherein said allocating further comprises allocating at least a portion of the first security workload and a third security workload between the first device and a third device, wherein the third device is protected by a third security agent installed thereon, wherein the third device is enabled to share the third security workload with the first device without determining that the third security agent is trusted by first security agent, and instructing the first security agent and the second security agent to perform tasks according to the changed allocation, whereby improving efficiency of performing the first security workload and the second security workload.

* * * * *